(12) United States Patent
Borst et al.

(10) Patent No.: US 9,363,814 B2
(45) Date of Patent: Jun. 7, 2016

(54) RATE ALLOCATION METHOD AND APPARATUS FOR OPTIMIZATION OF ADAPTIVE WIRELESS VIDEO STREAMING

(71) Applicants: Simon C. Borst, Convent Station, NJ (US); Martin I. Reiman, Maplewood, NJ (US); Vinay Joseph, Austin, TX (US)

(72) Inventors: Simon C. Borst, Convent Station, NJ (US); Martin I. Reiman, Maplewood, NJ (US); Vinay Joseph, Austin, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 151 days.

(21) Appl. No.: 14/188,845

(22) Filed: Feb. 25, 2014

(65) Prior Publication Data

US 2015/0245318 A1    Aug. 27, 2015

(51) Int. Cl.
*G06F 15/173* (2006.01)
*H04W 72/04* (2009.01)
*H04L 29/06* (2006.01)
*H04W 48/06* (2009.01)
*H04W 28/22* (2009.01)

(52) U.S. Cl.
CPC ......... *H04W 72/044* (2013.01); *H04L 65/4084* (2013.01); *H04L 65/80* (2013.01); *H04W 28/22* (2013.01); *H04W 48/06* (2013.01)

(58) Field of Classification Search
CPC ... H04W 72/04; H04W 48/06; H04W 72/044; H04L 65/4084; H04L 65/80
USPC ......................................... 709/223, 225, 226
See application file for complete search history.

(56) References Cited

U.S. PATENT DOCUMENTS

| | | |
|---|---|---|
| 2004/0013089 A1 | 1/2004 | Taneja et al. |
| 2004/0057420 A1 | 3/2004 | Curcio et al. |
| 2004/0082363 A1 | 4/2004 | Hosein |
| 2005/0232148 A1 | 10/2005 | Curcio et al. |
| 2006/0023629 A1 | 2/2006 | Kim et al. |
| 2006/0182065 A1 | 8/2006 | Petrovic et al. |
| 2008/0068981 A1 | 3/2008 | Marinier |
| 2008/0192773 A1* | 8/2008 | Ou .................. H04L 12/2801 370/468 |

(Continued)

FOREIGN PATENT DOCUMENTS

| | | |
|---|---|---|
| EP | 2416537 | 2/2012 |
| WO | WO 2010/049002 | 5/2010 |
| WO | WO 2010/111953 | 10/2010 |
| WO | WO 2010/148033 | 12/2010 |
| WO | WO 2011/004055 | 1/2011 |

OTHER PUBLICATIONS

International Search Report and Written Opinion for corresponding International Patent Application No. PCT/US2012/055282 dated Nov. 27, 2012.

(Continued)

*Primary Examiner* — Mohamed Wasel
(74) *Attorney, Agent, or Firm* — Harness, Dickey & Pierce, P.L.C.

(57) ABSTRACT

A method and an apparatus for adaptively allocating available bandwidth for network users. The method is particularly beneficial in improving a viewing experience for mobile devices accessing the network, while also maximizing the number of supported users within the network. An adaptively adjusted control parameter is used in conjunction with a utility function to assign a provisional rate for users entering the network. Based on the assigned provisional rate, the method then admits prospective new network users, if enough free capacity exists to service the new user at the provisional rate.

20 Claims, 4 Drawing Sheets

(56) References Cited

U.S. PATENT DOCUMENTS

| | | | |
|---|---|---|---|
| 2009/0046642 A1 | 2/2009 | Damnjanovic | |
| 2009/0067335 A1 | 3/2009 | Pelletier et al. | |
| 2010/0043053 A1 | 2/2010 | Wei et al. | |
| 2010/0128722 A1 | 5/2010 | Madour et al. | |
| 2010/0135229 A1 | 6/2010 | Lohr et al. | |
| 2010/0246533 A1 | 9/2010 | Lundin et al. | |
| 2011/0038325 A1 | 2/2011 | Varma | |
| 2011/0044304 A1* | 2/2011 | Connelly | H04W 36/0033 370/338 |
| 2011/0138064 A1* | 6/2011 | Rieger | G06F 17/30905 709/228 |
| 2011/0141890 A1 | 6/2011 | Giaretta et al. | |
| 2011/0179185 A1 | 7/2011 | Wang et al. | |
| 2012/0134267 A1 | 5/2012 | Noriega et al. | |
| 2012/0250509 A1 | 10/2012 | Leung et al. | |
| 2012/0307784 A1 | 12/2012 | Heden et al. | |
| 2013/0215793 A1 | 8/2013 | Cutler et al. | |
| 2014/0149262 A1* | 5/2014 | Parekh | H04L 43/0882 705/27.1 |
| 2014/0149562 A1* | 5/2014 | Xiao | H04L 41/0879 709/222 |

OTHER PUBLICATIONS

3GPP TS 23.203, "3rd Generation Partnership Project; Technical Specification Group Services and System Aspects; Policy and charging control architecture (Release 8)", V8.9.0, Mar. 2010.

"3rd Generation Partnership Project; Technical Specification Group Services and System Aspects; Policy and charging control architecture (Release 11)", 3GPP Standard; 3GPP TS 23.203, 3rd Generation Partnership Project (3GPP), Mobile Competence Centre; 650, Route Des Lucioles; F-06921 Sophia-Antipolis Cedex; France, vol. SA WG2, No. V11.3.0, Sep. 21, 2011, pp. 1-167, XP050553787.

International Search Report dated Jan. 10, 2013 for related International Application No. PCT/US2012/057462.

International Preliminary Report dated Apr. 17, 2014.

Zaki et al. Multi-qos Aware Fair Scheduling LTE May 2011.

Alasti et al, Quality of Service in WIMAX and LTE Networks, May 2010.

May 21, 2013 Office Action issued in corresponding U.S. Appl. No. 13/253,368.

Nov. 7, 2013 Office Action issued in corresponding U.S. Appl. No. 13/253,393.

G.E. Cho, C.D. Meyer (2001), Comparison of perturbation bounds for the stationary distribution of a Markov chain, Lin alg. Appl 335, 137-150.

P.J. Hunt C.N. Laws (1997) Optimization via trunk reservation in single resource loss systems under heavy traffic Ann. Appl. Prob 7 (4), 1058-1079.

H.J. Kusher, G.G. Yin (2003), Stochastic Approximation and Recursive Algorithms and Applications, Springer, Chapter 4, Mathematical Background.

H.J. Kusher, G.G. Yin (2003), Stochastic Approximation and Recursive Algorithms and Applications, Springer, Chapter 8, Weak Convergence Methods for General Algorithms.

\* cited by examiner

RATE ALLOCATION METHOD AND APPARATUS FOR OPTIMIZATION OF ADAPTIVE WIRELESS VIDEO STREAMING

BACKGROUND OF THE INVENTION

1. Field of the Invention

Example embodiments relate generally to wireless communication, and more particularly to a method and apparatus for adaptively allocating available bandwidth for network users. The method may be particularly applied to hypertext transfer protocol (HTTP)-based video streaming where a lower variability in rate adjustments with smoother temporal evolution of streaming rates may improve a user's viewing experience while maximizing the number of supported users.

2. Related Art

As shown in FIG. 1, an inherent conventional characteristic of wireless networks is user heterogeneity in the sense that users 10 close to a base station 1 enjoy strong channels, while distant users 20 receive far weaker signals. To increase the QoE for all users 10/20, ideally a higher time-average rate would be applied to all users. However, due to a shortage of network resources, a more realistic alternative is to allow users to have heterogeneous channel conditions, and hence different resource requirements for a given bit rate.

Especially with regard to video traffic, this type of traffic is experiencing tremendous growth that is partially fueled by the proliferation of online video content and the steady expansion in transmission bandwidths. The amount of video traffic is forecast to double annually in the next several years, and is expected to account for the dominant share of wireline and wireless Internet traffic.

The huge growth in traffic volume goes hand in hand with a shift towards hypertext transfer protocol (HTTP)-based adaptive streaming mechanisms, which allow the video rate to be adjusted to the available network bandwidth. In view of these trends, it is critical to design video streaming mechanisms that use the available network resources efficiently and provide an adequate quality-of-experience (QoE) to the users. While a comprehensive video quality perception metric is hard to define, it is widely agreed that the QoE improves not only with a higher time-average rate, but also with a smoother temporal evolution. Typically a fundamental trade-off arises between these two criteria, because a higher time-average rate entails a more responsive scheme that makes more aggressive rate adjustments, compromising smoothness. Measurement experiments indicate that currently deployed schemes do not necessarily perform well in that regard, and may induce high variability and even oscillations as a result of interactions among several rate-adaptive users. This has triggered numerous proposals for enhancements, involving a variety of techniques, ranging from multipath solutions, network caching, traffic shaping and layered coding to improved bandwidth estimation at the client side in conjunction with dynamic rate selection at the server side.

The above challenges are particularly pertinent in wireless networks where the available bandwidth is not only relatively limited, but also inherently uncertain and time-varying due to fading and user mobility. On the other hand, resource allocation mechanisms in wireless cellular networks offer greater capabilities for controlling the user throughput, especially since the wireless link is commonly the bottleneck in the end-to-end path. In particular, scheduling algorithms at the base stations tend to provide support for specifying suitable target throughputs for the various users, and thus ensuring a smooth streaming rate. The proposed enhancements of HTTP-based adaptive streaming mechanisms mentioned above have exploited a wide range of approaches for mitigating the impact of variations in network bandwidth at the client and/or server, but have not leveraged the option to exercise direct control over the user throughput at a network element.

SUMMARY OF INVENTION

Example embodiments provide a method and apparatus for adaptively allocating available bandwidth for network users, especially for hypertext transfer protocol (HTTP)-based video streaming where the quality-of-experience (QoE) for viewers may be particularly impacted by variations in rate adjustments. In particular, the method may iteratively adapt a control parameter based on real-time aggregate load information for all network users, each time a network user enters or leaves the network. This control parameter may in turn be used to determine a provisional rate for prospective new users that are initially attempting to enter the network. By iteratively adapting the control parameter over time (and, in turn, iteratively adapting the provisional rate for prospective new users of the network), the aggregate long-term rate utility for the network may be optimized to ensure smoothness over longer time scales. This method may be implemented without the knowledge of channel and traffic parameters of the network users.

In one embodiment, a rate allocation method includes adapting, by a processor, a control parameter value as user equipment (UE) enter a network sector based on a total load for tagged UE of the network sector and a determination to tag a prospective new UE, wherein the tagged UEs of the network sector correspond with all current and prospective network sector UEs that entered the network sector at an instance when the processor determined that the free capacity of the network sector is larger than or equal to a capacity threshold; assigning, by the processor, a provisional rate for the prospective new UE of the network sector based on the control parameter value and a determined marginal pay-off for admitting the prospective new UE; determining, by the processor, free capacity of the network sector; admitting, by the processor, the prospective new UE if enough free capacity exists in order for the network sector to service the prospective new UE at the provisional rate, wherein this method is accomplished without the knowledge of channel and traffic statistics of the network sector.

In another embodiment a device includes a processor, configured to, adapt a control parameter value as user equipment (UE) enter a network sector based on a total load for tagged UE of the network sector and a determination to tag a prospective new UE, wherein the tagged UEs of the network sector correspond with all current and prospective network sector UEs that entered the network sector at an instance when the processor determined that the free capacity of the network sector is larger than or equal to a capacity threshold; assign a provisional rate for the prospective new UE of the network sector based on the control parameter value and a determined marginal pay-off for admitting the prospective new UE; determine free capacity of the network sector; admit the prospective new UE if enough free capacity exists in order for the network sector to service the prospective new UE at the provisional rate, wherein the processor does not require knowledge of channel and traffic statistics of the network sector.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
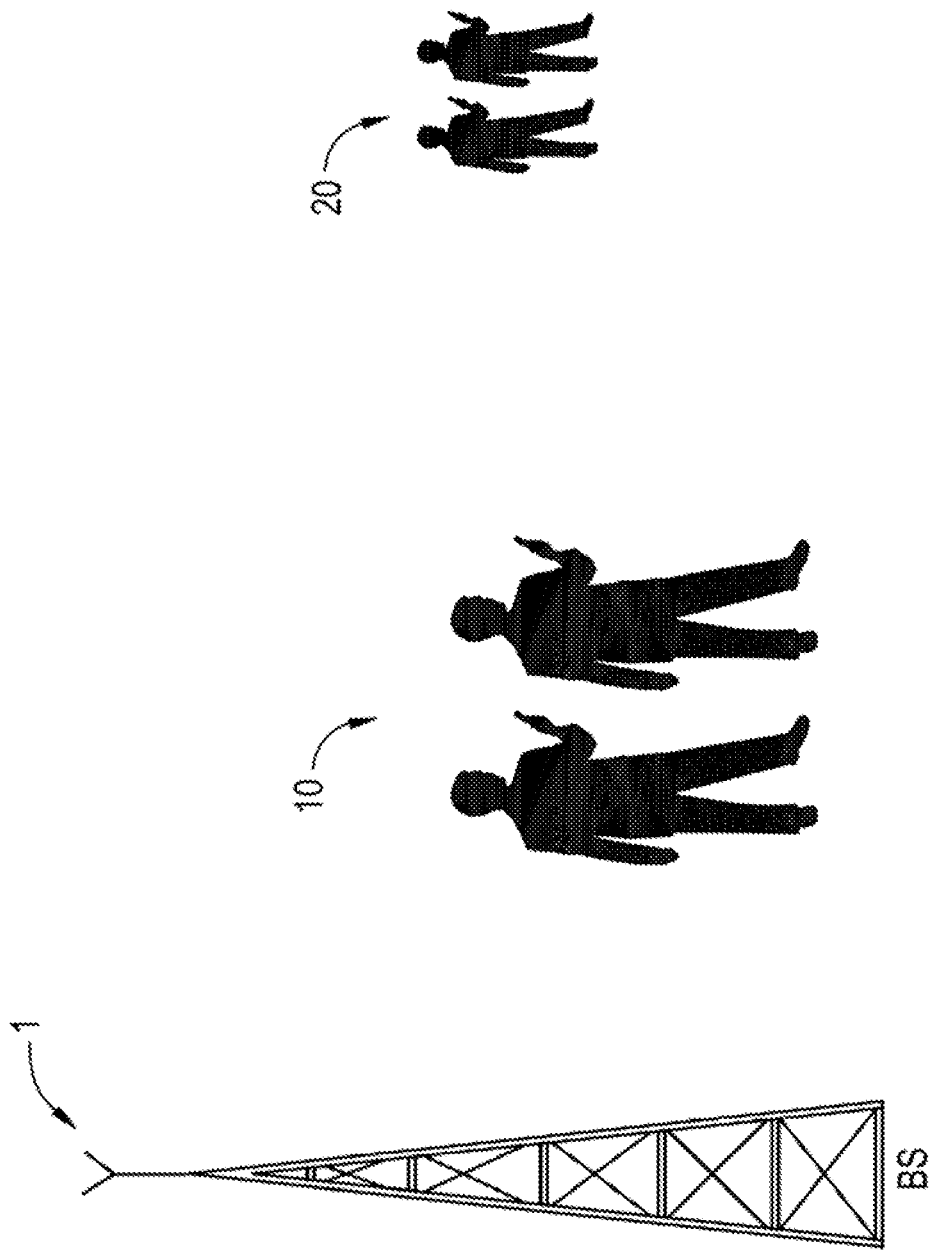
FIG. 1 is a simplified depiction of groups of users in a conventional wireless network.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Section I

Introduction

Since the key aim of the target user usage rates is to ensure smoothness over longer time scales, purposefully not accounting for fast variations in channel conditions and instead focusing on the impact of slower dynamics arising due to the arrivals (service requests) and departures (service completions) of users assists the rate allocation method according to example embodiments. The target rates for the various users can be selected from either a continuous range or a discrete set, and adapted at any point in time based on the user dynamics. Admission control may also be incorporated into the rate allocation method, by allowing a user to be assigned a zero target rate upon arrival.

A sample path upper bound is first established for an objective function (the aggregate average utility reduced by a rate variation penalty). The upper bound is characterized through the optimal value of a relatively simple mathematical program, either a linear program or a concave optimization problem, depending on whether the set of admissible target rates is discrete or continuous. The upper bound is asymptotically achievable (in a ratio sense) in a regime where the offered traffic and capacity grow large in proportion. Asymptotic optimality may be achieved by 'static' policies which either deny service to a user upon arrival or assign it a fixed target rate (in accordance with the optimal solution of the above-mentioned mathematical program), without requiring advance knowledge of the duration.

The asymptotic optimality of static rate assignment policies provides a natural paradigm for the design of sound, lightweight approaches, only involving the calculation of the asymptotically optimal rate assignments. The latter task is elementary when all the relevant system parameters are known, but in practice several parameters will be subject to uncertainty and variation over time, raising estimation challenges and accuracy issues. Instead, the fact that the asymptotically optimal rate assignment policy exhibits a specific structure may be exploited, allowing it to be represented through just a single variable, where the load induced on the system is unity. Leveraging these two properties, an approach for learning and tracking the asymptotically optimal rate assignments by adapting a single variable so as to drive the observed load to unity may be developed. Instant example embodiments rely on observations of the occupancy state, without any explicit knowledge or estimates of the system parameters. Instant example embodiments perform well, even in scenarios with a relatively moderate amount of capacity and offered traffic.

Setting target rates at a base station is commonly supported by existing wireless scheduling algorithms, and complementary with bandwidth estimation algorithms at a client device and dynamic rate selection at a network server. The resulting throughput smoothing makes the latter tasks substantially lighter, and the joint control reduces the potential for oscillations and harmful interactions among separately controlled competing adaptive players.

Section II

Model Description and Problem Solving Formulation

Considering a single wireless downlink channel shared by streaming users from a finite set of classes indexed by $s \in S$. The various classes could reflect heterogeneity among users and video objects in terms of wireless channel characteristics, available compression rates, or Quality Rate (QR) dependencies. Let $\tau_i$ be the arrival time of the ith user, i.e., the time when the user requests a particular video, with $\tau_1 \geq 0$. Denote by $s(i)$ the index of the class to which the ith user belongs. Let $\sigma_i$ be the service time of the ith user, i.e., the nominal duration of the video of interest.

Rate $r_i(t)$ is assigned to the ith user at time $t \geq 0$. Rate $r_i(t)$ should not be thought of as an instantaneous transmission rate, but rather rate $r_i(t)$ represents a target for the average throughput over a time scale which is long compared to the slot level on which wireless schedulers operate, and commensurate with the buffering depth at the video client. The value of $r_i(t)$ only has significance for $t \in [\tau_i, \tau_i + \sigma_i]$, but for notational convenience the value may be defined for all $t \geq 0$. The rate assignments for class-s users are constrained to a finite set $R_s$:

$$r_i(t) \in R_{s(i)} \cup \{0\} \text{ for all } t \geq 0 \tag{1}$$

Rate $r_i(t)$ may correspond to the various compression rates available for videos streamed by class-s users. The constraint $r_i(t)=0$ is not explicitly imposed for $t \notin [\tau_i, \tau_i+\sigma_i]$, since this will not be directly relevant in the utility optimization problem of the instant example embodiments. The capacity requirement per unit bit rate for class-s users is $c_s$, which would depend on channel quality characteristics such as the Signal-to-Interference-and-Noise Ratio. Assuming the total capacity to be normalized to unity, the rate assignments may then satisfy the further constraint:

$$\sum_{i=1}^{\infty} c_{s(i)} r_i(t) \leq 1 \text{ for all } t \geq 0. \tag{2}$$

The quantity $\rho_s=1/c_s$ may be interpreted as the transmission rate of a class-s user if it were assigned the full resources.

The QoE experienced by a streaming user depends on the time-average rate utility as well as the temporal variability. To achieve an optimal trade-off between these two criteria, it is assumed that the QoE metric for the ith user during the time interval $[0,T]$, $\tau_i \leq T$, can be expressed as:

$$A_i(0,T) - \gamma V_i(0,T) \tag{2a}$$

$A_i(0,T)$ represents the time-average rate utility, $V_i(0,T)$ is a penalty term for the rate variability, and $\gamma$ is a nonnegative weight factor. Based upon this understanding, it is supposed that $$A_i(0,T) = \int_{t=\tau_i}^{\tau_i+\sigma_i(T)} U_{s(i)}(r_i(t)) dt \qquad (2b)$$

Where $\sigma_i(T) = \min\{\sigma_i, T-\tau_i\}$ and $U_s(\cdot)$ a concave utility function with $U_s(0)=0$. The function $U_s(\cdot)$ (which can be obtained using well-known methods for QoE-based multi-stream scalable video over networks) may be chosen to reflect class-related QR dependencies, such that $U_s(r(t))$ provides a proxy for the instantaneous quality for a class-s user's video with compression rate $r(t)$. These QR dependencies will be video-dependent, where a 'high-detail' video with a lot of scene changes (e.g., an action movie) will have a 'steeper' QR dependency compared to a 'slower' video.

$V_i(0,T)$ may be an arbitrary nonnegative function of $\{r_i(t)\}_{t \in [0,T]}$, with the property that $V_i(0,T)=0$ when $r_i(t) \equiv r_i$ for all $t \in [\tau_i, \tau_i+\sigma_i(T)]$. For example, $V_i(0,T)$ could represent the time standard deviation of quality over the interval $[0,T]$, as shown below:

$$V_i(0,T) = \left( \frac{1}{\sigma_i(T)} \int_{t=\tau_i}^{\tau_i+\sigma_i(T)} \left( U_{s(i)}(r_i(t)) - \frac{A_i(0,T)}{\sigma_i(T)} \right)^2 dt \right)^{\frac{1}{2}} \qquad (2c)$$

The metric $A_i(0,T) - \gamma V_i(0,T)$ may fit into any well-known video QoE model.

The maximum achievable net aggregate QoE during the time interval $[0,T]$ may thus be expressed as the optimal value $OPT_\gamma(T)$ of the optimization problem:

$$\max \sum_{i=1}^{I(T)} [A_i(0,T) - \gamma V_i(0,T)], \qquad (2d)$$

with $I(T) = \sup\{i : \tau_i \leq T\}$, subject to the constraints:

$$r_i(t) \in R_{s(i)} \cup \{0\} \text{ for all } t \in [0,T] \qquad (3)$$

and $$\sum_{i=1}^{I(T)} \sum_{i=1}^{I(T)} c_{s(i)} r_i(t) \leq 1 \text{ for all } t \in [0,T] \qquad (4)$$

Observe that $OPT_\gamma(T)$ is nonincreasing in $\gamma$, and in particular bounded from above by $OPT_0(T)$ (i.e., net aggregate utility) where the penalty for the rate variability is entirely dropped.

Remark 1

For non-trivial choices of $V_i(0,T)$ (such as time variance), determining the rate assignments that achieve $OPT_\gamma(T)$ would require a clairvoyant or off-line optimization scheme with full knowledge of the sample path in terms of the arrival times and service times. In practice, one would use online schemes that need to make rate assignment decisions without any prior knowledge of future arrival times or residual service times. As will be shown however, under mild assumptions, suitable online schemes asymptotically achieve the same long-term value for $$\frac{1}{T} OPT_\gamma(T)$$

for any $\gamma > 0$ as clairvoyant schemes, even when exempt from a penalty for rate variability, can achieve for $$\frac{1}{T} OPT_0(T).$$

Remark 2

The above formulation allows for zero rate assignments, i.e., $r_i(t)=0$ for some time epoch $t \in [\tau_i, \tau_i+\sigma_i(T)]$, which may be interpreted as a service request being denied or a flow being aborted. Thus it may not be meaningful in practice to change the rate assignment from a zero to a non-zero value. In the above formulation, we do not explicitly rule out such rate changes, and achieving $OPT_\gamma(T)$ might require such actions in certain cases. However, the rate assignment policies that we develop never make such changes, and in fact never change the initial rate assignment at all. Yet, they asymptotically achieve the same long-term value for $$\frac{1}{T} OPT_\gamma(T)$$

for any $\gamma > 0$ as schemes that are allowed to make such changes and are not penalized for rate variability can achieve for $$\frac{1}{T} OPT_0(T).$$

Remark 3

Considering a myopic rate assignment policy, which at any point in time t assigns rates so as to maximize $\Sigma_{i:t \in [\tau_i, \tau_i+\sigma_i]} U_s(r_i(t))$, subject to the constraints (1) and (2), disregarding the effect of rate variations. It can be shown that the utility achieved by such a myopic policy approaches $OPT_0(T)$ as $\gamma \downarrow 0$ for any given sample path with a bounded number of arrivals during $[0,T]$.

Remark 4

Considering the class of fixed-rate assignment policies, which satisfy the further constraint that $r_i(t) \equiv r_i$, for all $t \in [\tau_i, \tau_i+\sigma_i(T)]$, and assuming that $V_i(0,T)>0$ unless $r_i(t)=r_i$ for all $t \in [\tau_1, \tau_i+\sigma_i(T)]$. It can be shown that $OPT_\gamma(T)$ is achievable by a policy from this class as $\gamma \to \infty$ for any given sample path with a bounded number of arrivals during $[0,T]$.

Remark 5

The service time $\sigma_i$ of the ith user could depend on the rate allocated to the user over time. For instance, poor rate allocations could lead to low quality or rebuffering, and result in the user viewing the video for a shorter duration. However, good models are needed for such user behavior and, even with good models, such systems may be difficult to analyze. Also, note that $\sigma_i$ and the amount of time for which the ith user is served could potentially be different. For instance, if the user is allocated high rates, the user could quickly download the video and essentially leave the system. However, most of the current players try to 'match' the video compression rates with the allocated rates to exploit better channels for better quality. In those settings, $\sigma_i$ serves as a good approximation of the amount of time for which the ith user is served.

Section III

Utility Upper Bounds

In order to derive upper bounds for the maximum achievable net aggregate utility (which upper bounds maximum achievable net aggregate QoE), some bounds hold in a sample path sense, but for other results, a statistical assumption may be made:

A1: class-s users arrive as a renewal process with mean interarrival time $\alpha_s$, Or, a stronger Markovian assumption may be made:

A2: class-s users arrive as a Poisson process of rate $\lambda_s$,

Where the assumption above is used in conjunction with:

B: class-s users have i.i.d. service times with mean $\beta_s$

The offered traffic associated with class $s \in S$ is defined, under assumptions A1 or A2 and B as $\rho_s = \beta_s/\alpha_s$ or $\rho_s = \lambda_s \beta_s$, respectively. Denote by $J(t) = |\{i : \tau_i \leq t < \tau_i + \sigma_i\}|$ the number of 'potentially' active users at time t. Note that the process $\{J(t)\}_{t \in \mathbb{R}}$ evolves over time as the number of customers in an infinite-server queue, i.e., a $G/G/\infty$ or $M/G/\infty$ under Assumptions A1 or A2, respectively.

Two scenarios may be distinguished depending on whether the rate sets $R_s$ are (D) discrete or (C) continuous in nature of the form $[r_s^{min}, r_s^{max}]$. For compactness, in the discrete case, we denote by $K = \Sigma_{s \in S} M_s$, with $M_s = |R_s| < \infty$, the total number of class-rate tuples. For later use, the set $I(s,T) = \{i : s(i) = s, \tau_i \leq T\}$ may be defined to contain the indices of the users that belong to class s and arrive before time T.

A. Scenario D

Proposition 1:

In case of discrete rate sets, $OPT_0(T)$ is bounded from above sample path wise by the optimal value OPT-UB-D(T) of the linear program LP-UB-D(T):

$$\max_{[(x_{sr})s \in S, r \in R_s] \in R_+^K} \sum_{s \in S} \sum_{r \in R_s} x_{sr} U_s(r)$$

$$\text{sub} \sum_{r \in R_s} x_{sr} \leq \sum_{i \in I(s,T)} \sigma_i \quad \forall s \in S$$

$$\sum_{s \in S} \sum_{r \in R_s} c_s r x_{sr} \leq T$$

Under Assumptions A1 and B, $$\frac{1}{T} OPT - UB - D(T) \rightarrow OPT - UB - D$$

in probability as $T \rightarrow \infty$, where OPT-UB-D is the optimal value of the linear program LP-UB-D:

$$\max_{[(f_{sr})s \in S, r \in R_s] \in P_+^K} \sum_{s \in S} \sum_{r \in R_s} \rho_s f_{sr} U_s(r) \quad (5)$$

$$\text{sub} \sum_{r \in R_s} f_{sr} \leq 1 \quad \forall s \in S \quad (6)$$

$$\sum_{s \in S} \sum_{r \in R_s} c_s r \rho_{sr} \leq 1 \quad (7)$$

Proof:

Let $\sigma_{i,r}$ be the amount of time during $[\tau_i, \tau_i + \sigma_i(T)]$ that the ith user ($\tau_i \leq T$) is assigned rate $r \in R_{s(i)}$. Let $x_{sr} = \Sigma_{i \in I(s,T)} \sigma_{i,r}$ be the total amount of time during $[0,T]$ that any class-s user is assigned rate $r \in R_s$. Noting that $U_s(0) = 0$, $A_i(0,T)$ may be written as $\Sigma_{r \in R_{s(i)}} \sigma_{i,r} U_{s(i)}(r)$, and thus $$\sum_{i=1}^{I(T)} A_i(0, T) = \sum_{s \in S} \sum_{r \in R_s} x_{sr} U_s(r)$$

Invoking the rate constraints (3) and observing that $\Sigma_{r \in R_{s(i)}} \sigma_{i,r} \leq \sigma_i(T) \leq \sigma_i$, the following is obtained:

$$\sum_{r \in R_s} x_{sr} \leq \sum_{i \in I(s,T)} \sigma_i \quad s \in S \quad (8)$$

Further, integrating the capacity constraints (4) over $t \in [0, T]$, the following is obtained:

$$\sum_{s \in S} \sum_{r \in R_s} c_s r x_{sr} \leq T \quad (9)$$

Thus, any rate assignment solution that satisfies constraints (3) and (4) will satisfy constraints (8) and (9) as well. Therefore, $OPT_0(T)$ is bounded from above by the maximum value of $\Sigma_{s \in S} \Sigma_{r \in R_s} x_{sr} U_s(r)$ subject to the constraints (8) and (9), which concludes the proof of the first statement of the proposition.

In order to establish the second statement, it is noted that, introducing variables $f_{sr} = x_{sr}/(\rho_s T)$, the linear program LP-UB-D(T) may be equivalently stated as $$\max_{[(f_{sr})s \in S, r \in R_s] \in P_+^K} \sum_{s \in S} \sum_{r \in R_s} \rho_s f_{sr} U_s(r) \quad (9a)$$

$$\text{sub} \sum_{r \in R_s} \rho_s f_{sr} \leq \frac{1}{T} \sum_{i \in I(s,T)} \sigma_i \quad \forall s \in S$$

$$\sum_{s \in S} \sum_{r \in R_s} c_s r \rho_s f_{sr} \leq 1$$

The key renewal theorem and the law of large numbers imply that $$\frac{1}{T} \sum_{i \in I(s,T)} \sigma_i \rightarrow \rho_s$$

in probability as $T \rightarrow \infty$.

As reflected in the proof of the above proposition, the linear program LP-UB-D may be interpreted as follows. The decision variables $f_{sr}$ represent the fractions of class-s users that are assigned rate $r \in R_s$, so their sum cannot exceed unity as expressed by the constraint (6). Further observe that $\rho_s$ is the mean number of class-s users with an active request at an arbitrary epoch. Thus the objective function (5) represents the expected utility rate at an arbitrary epoch, while the constraint (7) stipulates that the 'load', i.e., the expected total capacity requirement, cannot exceed unity.

Scenario C

Continuous Rate

For nonnegative real numbers r and a, denote $$P_s(r, a) = \begin{cases} aU_s\left(\dfrac{r}{a}\right), & \text{if } a > 0, \\ 0, & \text{if } a = 0. \end{cases} \quad (9b)$$

Note that $P_s(\cdot,\cdot)$ is a concave function.

Proposition 2:

In case of continuous rate sets, $OPT_0(T)$ is bounded from above sample path wise by the optimal value OPT-UB-C(T) of the convex optimization problem CP-UB-C(T):

$$\max_{[(x_s^+, r_s^+)_{s \in S}] \in P^{2|S|}} \sum_{s \in S} x_s^+ U_s(r_s^+) \quad (9c)$$

$$sub \, r_s^{min} \le r_s^+ \le r_s^{max} \; \forall s \in S$$

$$x_s^+ \le \sum_{i \in I(s,T)} \sigma_i \; \forall s \in S$$

$$\sum_{s \in S} c_s r_s^+ x_s^+ \le T$$

Also, under Assumption A1 and B, $$\frac{1}{T} OPT\text{-}UB\text{-}C(T) \to OPT\text{-}UB\text{-}C$$

in probability as $T \to \infty$, where OPT-UB-C is the optimal value of the convex optimization problem CP-UB-C:

$$\max_{[(a_s, r_s)_{s \in S}] \in P_+^{2|S|}} \sum_{s \in S} \rho_s P_s(r_s, a_s) \quad (10)$$

$$sub \, a_s r_s^{min} \le r_s \le a_s r_s^{max} \; \forall s \in S \quad (11)$$

$$a_s \le 1 \; \forall s \in S \quad (12)$$

$$\sum_{s \in S} c_s \rho_s r_s \le 1 \quad (13)$$

Proof:

Let $\sigma_i^0$ be the amount of time during $[\tau_i, \tau_i + \sigma_i(T)]$ that the ith user ($\tau_i \le T$) is assigned rate 0 and $\sigma_i^+ = \sigma_i(T) - \sigma_i^0$ the amount of time that it is assigned some rate $r \in R_{s(i)}$. Let $x_s^0 = \Sigma_{i \in I(s,T)} \sigma_i^0$ and $x_s^+ = \Sigma_{i \in I(s,T)} \sigma_i^+$. Noting that $U_s(0)=0$, Jensen's inequality implies that:

$$\sum_{i \in I(s,T)} A_i(0, T) \le x_s^+ U_s(r_s^+), \text{ with} \quad (13a)$$

$$r_s^+ = \frac{1}{x_s^+} \sum_{i \in I(s,T)} \int_{t=\tau_i}^{\tau_i + \sigma_i(T)} r_i(t) dt, \quad (13b)$$

so that $r_s^+ \in R_s$. Invoking the rate constraints (3) and observing that $\sigma_i^+ \le \sigma_i(T) \le \sigma_i$, the following is obtained:

$$x_s^+ \le \sum_{i \in I(s,T)} \sigma_i \; s \in S \quad (14)$$

Further, integrating the capacity constraints (4) over $t \in [0, T]$, the following is obtained:

$$\sum_{s \in S} \sum_{r \in R_s} c_s r_s^+ x_s^+ \le T. \quad (15)$$

Thus, any rate assignment solution that satisfies constraints (3) and (4) will satisfy constraints (14) and (15) as well. Therefore, $OPT_0(T)$ is bounded from above by the maximum value of $\Sigma_{s \in S} x_s^+ U_s(r_{r+})$ subject to the constraints $r_s^+ \in R_s$ for all $s \in S$, (14) and (15), which concludes the proof of the first statement of the proposition.

In order to establish the second statement, we note that, introducing variables $r_s = a_s r_s^+$, $a_s = x_s^+/(\rho_s T)$, the convex optimization problem CP-UB-C(T) may be equivalently stated as:

$$\max_{(a_s, r_s)_{s \in S} \in P_+^{2|S|}} \sum_{s \in S} \rho_s P_s(r_s, a_s) \quad (15a)$$

$$sub \, a_s r_s^{min} \le r_s \le a_s r_s^{max} \; \forall s \in S$$

$$a_s \rho_s \le \frac{1}{T} \sum_{i \in I(s,T)} \sigma_i \; \forall s \in S$$

$$\sum_{s \in S} c_s \rho_s r_s \le 1.$$

The key renewal theorem and the law of large numbers imply that $$\frac{1}{T} \sum_{i \in I(s,T)} \sigma_i \to \rho_s$$

in probability as $T \to \infty$.

Remark 6

Inspection of the above proof shows that the upper bound OPT-UB-C(T) applies for discrete rate sets as well, and even if $A_i(0,t)$ were replaced by $$\sigma_i^+ U_{s(i)}\left(\frac{1}{\sigma_i^+} \int_{t=\tau_i}^{\tau_i + \sigma_i(T)} r_i(t) dt\right).$$

However, the upper bound will not be asymptotically achievable in general for discrete rate sets.

Section IV

Asymptotic Optimality

OPT-UB-D is Asymptotically Achievable

Under Assumptions A2 and B, the upper bound OPT-UB-D for the long-term average utility rate (as provided in Proposition 1) is asymptotically achievable (in a ratio sense) in a regime where the offered traffic and transmission capacity grow large in proportion. More specifically, consider a sequence of systems, each indexed by a positive integer n. Each system has the same set of user classes S, the same rate sets $R_s$ and the same utility functions $U_s(\cdot)$. In the n-th system the class-s capacity requirement is $c_s^{(n)}=c_s/n$, and the arrival rate and mean service time are such that $\rho_s^{(n)}=\lambda_s^{(n)}\beta_s^{(n)}=n\rho_s$. OPT-D$^{(n)}$ may be the maximum achievable long-term average utility rate in the n-th system, and OPT-UB-D$^{(n)}$ may be the optimal value of the linear program LP-UB-D for the n-th system. Since the number of 'potentially' active users evolves as the number of customers in an infinite-server queue, it follows that the system is regenerative. The renewal-reward theorem then implies that the long-term average utility rate $U_\pi^{(n)}$ achieved in the n-th system by a stationary policy $\pi$ exists, and can further be used to argue that OPT-D$^{(n)}$ is well-defined as well.

Proposition 3:

Under Assumption A2 and B, $$\lim_{n\to\infty} \frac{OPT\text{-}D^{(n)}}{OPT\text{-}UB\text{-}D^{(n)}} = 1 \qquad (15b)$$

Proposition 1 implies OPT-D$^{(n)} \leq$ OPT-UB-D$^{(n)}$ for all n. By definition, OPT-D$^{(n)}$ is no less than the long-term average utility rate $U_\pi^{(n)}$ achieved in the n-th system by any given policy $\pi$. Also, substituting $c_s^{(n)}=c_s/n$ and $\rho_s^{(n)}=n\rho_s$ in the linear program LP-UB-D for the n-th system yields OPT-UB-D$^{(n)}=n\times$OPT-UB-D. Thus it suffices to show that $$\liminf_{n\to\infty} \frac{U_\pi^{(n)}}{n \times OPT\text{-}UB\text{-}D} \geq 1$$

for some specific policy $\pi$. There are several candidate policies $\pi$ for which the latter can be shown.

Option (i)

Complete Partitioning

For every class-rate pair (s,r), define $C_{sr}^{(n)}=\lfloor n\rho_s f_{sr}^*\rfloor$, where $(f_{sr}^*)_{s\in S, r\in R_s}$ is the optimal solution to the linear program LP-UB-D (where usually, only $|S|+1$ of these variables will in fact be non-zero, as will be shown later). Consider a policy $\pi$ which assigns an arriving class-s user a nominal rate $r \in R_s$ with probability $f_{sr}^*$. In the n-th system the user is then admitted and provided that rate for its entire duration, if the total number of class-s users with that rate assignment remains below $C_{sr}^{(n)}$, or otherwise rejected. Note that the aggregate capacity requirement for admitted users in the n-th system is bounded from above at all times by:

$$\sum_{s\in S}\sum_{r\in R_s} c_s^{(n)} r C_{sr}^{(n)} \leq \sum_{s\in S}\sum_{r\in R_s} c_s r \rho_s f_{sr}^* \leq 1 \qquad (15c)$$

By virtue of (7), the capacity constraints are obeyed. In effect, this yields K (or typically only $|S|+1$) independent Erlang-B loss systems with offered loads $n\rho_s f_{sr}^*$, and capacities $C_{sr}^{(n)}$. Since each of these systems is critically loaded, it can be easily shown that the blocking probabilities for each of the class-rate pairs (s,r) tend to zero as $n\to\infty$. Thus, for any $\epsilon>0$, the expected number of active class-s users with rate assignment $r\in R_s$ in the n-th system will be larger than $(1-\epsilon)$ $n\rho_s f_{sr}^*$ for n sufficiently large. Noting that the utility enjoyed by each of these users is $U_s(r)$, it may be deduced that:

$$U_\pi^{(n)} \geq (1-\epsilon)n\sum_{s\in S}\sum_{r\in R_s}\rho_s f_{sr}^* U_s(r) = (1-\epsilon)n\times OPT\text{-}UB\text{-}D \qquad (15d)$$

When n is sufficiently large, $$\liminf_{n\to\infty} \frac{U_\pi^{(n)}}{n\times OPT\text{-}UB\text{-}D} \geq 1-\epsilon$$

is implied. Since $\epsilon>0$ can be arbitrarily small, the statement follows.

Option (ii)

Complete Sharing

Consider a policy $\pi$ which assigns an arriving class-s user a nominal rate $r\in R_s$ with probability $f_{sr}^*$. In the n-th system the user is then admitted and provided that rate for its entire duration, if the total capacity required by all active users remains below 1, or otherwise rejected. In effect, this yields an Erlang loss system with K (or typically only $|S|+1$) classes with offered loads $n\rho_s f_{sr}^*$ and per-user capacity requirements $rc_s$, and total available capacity n. Since $\Sigma_{s\in S}\Sigma_{r\in R_s}c_s r\rho_s f_{sr}^* \leq 1$ by virtue of (7), this system is at most critically loaded, and it can be easily shown that the blocking probabilities for each of the class-rate pairs (s,r), $s\in S$, $r\in R_s$, tend to zero as $n\to\infty$. The statement then follows in a similar way as in the previous case.

As reflected in the proof of the above proposition, asymptotic optimality is achieved by 'static' rate assignment policies, which either deny service to a user or assign it a fixed rate independent of the state of the system at the time of arrival, without requiring advance knowledge of the duration. The latter features make such policies straightforward to implement. The specific complete partitioning and complete sharing policies primarily serve the purpose of mathematical tractability, and may not necessarily be ideal from a practical perspective. The asymptotic optimality of static rate assignment policies yields however a useful principle for the design of heuristic approaches. The only caveat is that solving the linear program LP-UB-D requires knowledge of the relevant channel and traffic parameters, such as the per-class arrival rates $\lambda_s$, the interarrival times $\alpha_s$, and/or the class-dependent mean service times $\beta_s$ of user. Estimation of these channel and traffic parameters requires knowledge of the distribution of the signal strength and/or signal-to-noise-and-interference rations in each cell of the network, as well as statistics on the type of user device (e.g., small or large screen sizes, etc.) and statistics on the type of video content requested (e.g., low or high motion), which may be cumbersome to collect. In practice, several of these channel and traffic parameters will be subject to uncertainty and variation over time, raising estimation challenges. In order to guide the design of such policies, the structural properties of the optimal solution to the linear program LP-UB-D may be examined and exploited, as described below.

OPT-UB-C is Asymptotically Achievable

Under Assumptions A2 and B, the upper bound OPT-UB-C for the long-term average utility rate as provided in Lemma 2 is asymptotically achievable (in a ratio sense) in a regime where the offered traffic and transmission capacity grow large in proportion. More specifically, let us consider a sequence of systems, each indexed by a positive integer n. Each system has the same set of user classes S, the same rate limits $r_s^{min}$ and $r_s^{max}$, and the same utility function $U_s(\cdot)$ as described above. In the n-th system the class-s capacity requirement is $c_s^{(n)}=c_s/n$, and the arrival and service rate parameters are such that $\rho_s^{(n)}=\lambda_s^{(n)}/\mu_s^{(n)}=n\rho_s$. Let OPT-$C^{(n)}$ be the maximum achievable long-term average utility rate in the n-th system, and let OPT-UB-$C^{(n)}$ be the optimal value of the convex optimization problem CP-UB-C for the n-th system. As before, the regenerative nature of the system and the renewal-reward theorem ensure that the long-term average utility rate $U_s^{(n)}$ achieved in the n-th system by a stationary policy $\pi$, and in particular OPT-$D^{(n)}$, exists.

Proposition 4:

Under Assumptions A2 and B, $$\lim_{n\to\infty}\frac{OPT\text{-}C^{(n)}}{OPT\text{-}UB\text{-}C^{(n)}}=1 \quad (15e)$$

Proof:

Proposition 1 implies that OPT-$C^{(n)} \leq$ OPT-UB-$C^{(n)}$ for all n. By definition, OPT-$C^{(n)}$ is no less that the long-term average utility rate $U_s^{(n)}$ achieved in the n-th system by any given policy $\pi$. Also, substituting $c_s^{(n)}=c_s/n$ and $\rho_s=n\rho_s$ in the convex optimization problem CP-UB-C for the n-th system yields that OPT-UB-$C^{(n)}=n\times$OPT-UB-C. Thus it suffices to show that $$\liminf_{n\to\infty}\frac{U_\pi^{(n)}}{n\times OPT\text{-}UB\text{-}C}\geq 1$$

for some specific policy $\pi$. There are several candidate policies $\pi$ for which the latter can be shown.

Option (i)

Complete Partitioning

For every class $s \in S$ with $a_s^* > 0$, define $C_s^{(n)} = \lfloor nr_s^*\rho_s \rfloor$, and consider a policy $\pi$ which assigns each arriving class-s user a nominal rate $r_s^*/a_s^*$, where $(a_s^*, r_s^*)_{s \in S}$ is the optimal solution to the convex optimization problem OPT-UB-C. In the n-th system the user is then admitted and provided that rate for its entire duration, if the total number of active class-s users remains below $C_s^{(n)}$, or otherwise rejected. Note that the aggregate capacity requirement of the admitted users in the n-th system is bounded from above at all times by $$\sum_{s\in S}c_s^{(n)}C_s^{(n)}\leq \sum_{s\in S}c_s\rho_s r_s^* \leq 1, \quad (15f)$$

With, by virtue of (13), the capacity constraints are obeyed. In effect, this yields S independent Erlang-B loss systems with offered loads $n\rho_s$ and capacities $C_s^{(n)}$. It can be easily shown that the blocking probability for class $s \in S$ tends to $1-a_s^*$ as $n\to\infty$. Thus, for any $\epsilon > 0$, the expected number of active class-s users in the n-th system will be larger than $(1-\epsilon)na_s^*\rho_s$ for n sufficiently large. Noting that the utility enjoyed by each of these users is $$U_s\left(\frac{r_s^*}{a_s^*}\right),$$

it may be deduced that:

$$U_\pi^{(n)} \geq (1-\epsilon)n\sum_{s\in S}a_s^*\rho_s U_s\left(\frac{r_s^*}{a_s^*}\right)=(1-\epsilon)n\times OPT\text{-}UB\text{-}C, \quad (15g)$$

When n is sufficiently large, $$\liminf_{n\to\infty}\frac{U_\pi^{(n)}}{n\times OPT\text{-}UB\text{-}C}\geq 1-\epsilon$$

may be implied. Since $\epsilon > 0$ can be taken arbitrarily small, the statement follows.

Option (ii)

Complete Sharing with Pre-Filtering

Consider a policy $\pi$ which assigns each arriving class-s user a nominal rate $r_s^*/a_s^*$ if $a_s^* > 0$ and zero otherwise. In the n-th system the user is then admitted and provided that rate for its entire duration with probability $a_s^*$, if the total capacity required by all active users remains below 1, or otherwise rejected. In effect, this yields an Erlang loss system with |S| classes with offered loads $n\rho_s a_s^* r_s^*$ and per-user capacity requirements $r_s^*/a_s^*$, and total available capacity n. Since $\sum_{s\in S} c_s \rho_s r_s^*$, this system is at most critically loaded, and it can be easily shown that the effective blocking probability for class $s \in S$ tends to $1-a_s^*$ as $n\to\infty$. The statement then follows in a similar way as in the previous case.

Like in the discrete-rate case, the complete partitioning and complete sharing policies are primarily considered for the sake of transparency, and may not necessarily be ideal for practical implementation purposes, but the asymptotic optimality of static rate assignment policies provides a strong basis for the design of heuristic approaches. As before, the only caveat is that solving the convex optimization problem CP-UB-C requires knowledge of various channel and traffic parameters that will be subject to uncertainty and variation over time, raising all sorts of estimation challenges. We will later revisit these issues and present parsimonious, online policies which retain the simplicity of a static rate assignment, but do not require any explicit knowledge or estimates of the traffic statistics. In order to guide the design of such policies, we will examine and exploit the structural properties of the optimal solution to the convex optimization problem CP-UB-C.

Section V

Structural Properties of (Asymptotically) Optimal Policies

As an initial step towards the design of parsimonious, online rate assignment algorithms we now proceed to examine the structural properties of the optimal solutions to the linear program LP-UB-D and the convex optimization problem CP-UB-C. For brevity, we will henceforth refer to these optimal solutions as the asymptotically optimal rate assignments.

Structure of Optimal Solution to LP-UB-D

With regard to the structure of the optimal solution to the linear program LP-UB-D, it will be convenient to use the representation $R_s = \{r_s^{(1)}, r_s^{(2)}, \ldots, r_s^{(M_s)}\}$, with $r_s^{(1)} < r_s^{(2)} < \ldots < r_s^{(M_s)}$. In the case that $\sum_{s \in S} c_s \rho_s r_s^{(M_s)} \leq 1$, the optimal solution is easily seen to be $$f_{sr_s^{(M_s)}} = 1$$

for all $s \in S$, and we henceforth assume that $\sum_{s \in S} c_s \rho_s r_s^{(M_s)} > 1$.

For compactness, the notation $\Delta U_{sm} = U_s(r_s^{(m)}) - U_s(r_s^{(m-1)})$ and $\Delta R_{sm} = r_s^{(m)} - r_s^{(m-1)}$, with $r_s^{(0)} = 0$ is introduced. Define $$Q_{sm} = \Delta U_{sm}/(c_s \Delta R_{sm}), \quad (15h)$$

which may be interpreted as a marginal payoff coefficient, i.e., the ratio of the improvement in the rate utility and the increment in the required capacity when increasing the rate of a class-s user from $r_s^{(m-1)}$ to $r_s^{(m)}$. The concavity of the function $U_s(\cdot)$ implies that $Q_{sm-1} \geq Q_{sm}$, $m = 2, \ldots M_s$. Denoting $x_{sm} = f_{sr_s^{(m)}}$, $y_{sm} = \sum_{n=m}^{M_s} x_{sn}$, and noting that $U_s(0) = 0$, the following may be defined:

$$\sum_{r \in R_s} r f_{sr} = \sum_{m=1}^{M_s} r_{sm} x_{sm}, \text{ and} \quad (16)$$

$$= \sum_{m=1}^{M_s} x_{sm} \sum_{n=1}^{m} \Delta R_{sn}$$

$$= \sum_{m=1}^{M_s} \Delta R_{sm} \sum_{n=m}^{M_s} x_{sn}$$

$$= \sum_{m=1}^{M_s} \Delta R_{sm} y_{sm}$$

$$\sum_{r \in R_s} f_{sr} U_s(r) = \sum_{m=1}^{M_s} x_{sm} U_s(r_s^{(m)}) \quad (17)$$

$$= \sum_{m=1}^{M_s} x_{sm} \sum_{n=1}^{m} \Delta U_{sn}$$

$$= \sum_{m=1}^{M_s} \Delta U_{sm} \sum_{n=m}^{M_s} x_{sn}$$

$$= \sum_{m=1}^{M_s} \Delta U_{sm} y_{sm}$$

Thus the linear program LP-UB-D may be equivalently stated as $$\max_{[(y_{sm})_{s \in S, m \in \{1, \ldots, M_s\}}] \in P_+^K} \sum_{s \in S} \rho_s \sum_{r \in R_s} \sum_{m=1}^{M_s} \Delta U_{sm} y_{sm} \quad (18)$$

$$sub\, y_{s1} \leq 1 \; \forall s \in S$$

$$y_{sm} \leq y_{sm-1} \; m = 2, \ldots, M_s, \forall s \in S$$

$$\sum_{s \in S} c_s \rho_s \sum_{m=1}^{M_s} \Delta R_{sm} y_{sm} \leq 1$$

The constraints $y_{s1} \leq 1$ and $y_{sm} \leq y_{sm-1}$, $m = 2, \ldots, M_s$, imply $y_{sm} \leq 1$ for all $m = 1, \ldots, M_s$. By adopting the latter weaker constraints, the linear program LP-UB-D may be viewed as a relaxed version of a knapsack problem, for which it is well-known that the optimal solution is obtained by selecting items in decreasing order of the relative reward ratio until the capacity is exhausted. Specifically, let $\pi(\cdot,\cdot)$ be a one-to-one mapping from $(s,m)_{s \in S, m \in \{1, \ldots, M_s\}}$ to $\{1, 2, \ldots, K\}$, and with minor abuse of notation, define $b_{\pi(s,m)} = c_s \rho_s \Delta R_{sm}$, $v_{\pi(s,m)} = \rho_s \Delta U_{sm}$, and $z_{\pi(s,m)} = y_{sm}$. By replacing the constraints $y_{s1} \leq 1$ and $y_{sm} \leq y_{sm-1}$, $m = 2, \ldots, M_s$, by $y_{sm} \leq 1$ for all $m = 1, \ldots, M_s$, then the linear program LP-UB-D takes the form:

$$\max_{(z_1, \ldots, z_K) \in P_+^K} \sum_{k=1}^{K} v_k z_k \quad (18a)$$

$$sub\, z_k \leq 1 \; k = 1, \ldots, K$$

$$\sum_{k=1}^{K} b_k z_k \leq 1$$

which amounts to the continuous relaxation of a knapsack problem. Without loss of generality, it may supposed that the mapping $\pi(\cdot,\cdot)$ is such that $$\frac{v_1}{b_1} \geq \frac{v_2}{b_2} \geq \ldots \geq \frac{v_K}{b_K}.$$

Let $K_R$ be the size of the set $\{v_k/b_k : k = 1, \ldots, K\}$. Thus, $K_R \leq K$ is the number of distinct values of $v_k/b_k$, or equivalently, the number of distinct values of $Q_{sm}$. Let $\pi_R(\cdot,\cdot)$ be the mapping from $(s,m)_{s \in S, m \in \{1, \ldots, M_s\}}$ to $\{1, 2, \ldots, K_R\}$ so that $\pi_R(s_1, m_1) < \pi_R(s_2, m_2) \Leftrightarrow Q_{s_1 m_1} > Q_{s_2 m_2}$. For $k = 1, \ldots, K_R$, define $\bar{b}_k = \sum_{l \in \pi_R^{-1}(k)} b_l$, $\bar{v}_k = \sum_{l \in \pi_R^{-1}(k)} v_l$, and $Q_R(k) = Q_{sm}$ for $(s,m) \in \pi_R^{-1}(k)$.

Denote $W = \{w \in [0,1]^{K_R} : w_k = 1 \text{ if } w_{k+1} > 0\}$. For a given $w \in W$, define $$z_{\pi(s,m)} = y_{sm} = w_{\pi_R(s,m)}, \; m = 1, \ldots, M_s, s \in S, \quad (18b)$$

and $$f_{sr_s^{(m)}} = y_{sm} - y_{sm+1}, \; m = 1, \ldots, M_s, s \in S \quad (18c)$$

Below is an auxiliary lemma.

Lemma 1

With the above definitions, $$\sum_{s \in S} \sum_{r \in R_s} c_s \rho_s r f_{rs} = \sum_{k=1}^{K} b_k z_k = \sum_{k=1}^{K_R} \bar{b}_k w_k, \text{ and} \quad (19)$$

$$\sum_{s \in S} \sum_{r \in R_s} \rho_s f_{rs} U_s(r) = \sum_{k=1}^{K} v_k z_k = \sum_{k=1}^{K_R} \bar{v}_k w_k. \quad (20)$$

The above two identities follow directly from (16) and (17) along with the definition of $z_{\pi(s,m)}$ and $y_{sm}$ in terms of $w_{\pi_R(s,m)}$.

The next lemma provides a useful characterization of the optimal solution to the linear program LP-UB-D. For a given $w \in W$, define $L_D(w) = \sum_{s \in S} \sum_{r \in R_s} c_s \rho_s r f_{sr}$ as the 'load' associated with $w$, with $f_{sr}$ defined in terms of $w$ as specified above.

Lemma 2

If $L_D(w)=1$, then the variables $f_{sr}$ constitute an optimal solution to the linear program LP-UB-D.

It may easily verified that the variables $f_{sr}$ provide a feasible solution to the linear program LP-UB-D. In order to establish optimality, note that if $L_D(w)=1$, then the identity (19) implies that $$\sum_{k=1}^{K} b_k z_k = \sum_{k=1}^{K_R} \overline{b}_k w_k = 1 \qquad (20a)$$

Since $w \in W$ means $w_k=1$ if $w_{k+1}>0$, it then follows that $(z_k^*)_{k=1,\ldots,K}$ with $$z_k^* = w^*_{\pi_R(\pi^{-1}(k))}$$

is an optimal solution to the above continuous relaxation of the knapsack problem. Because the latter problem is a relaxed version of the linear program LP-UB-D, the identity (19) then ensures that the variables $f_s$, in fact constitute an optimal solution.

As a final observation, note that if $\Sigma_{s \in S} c_s \rho_s r_s^{(M_s)} = \Sigma_{s \in S} \Sigma_{m=1}^{M_s} c_s \rho_s \Delta R_{sm} = \Sigma_{k=1}^{K_R} \overline{b}_k \geq 1$, then there exists a vector $w^* \in W$ for which $L_D(w^*)=1$, given by $$w_k^* = \begin{cases} 1, & k < K_R^*, \\ \left(1 - \sum_{l=1}^{K_R^*-1} \overline{b}_l\right)/\overline{b}_{K_R^*}, & k = K_R^*, \\ 0, & k > K_R^*, \end{cases} \qquad (21)$$

$$\text{with } K_R^* = \min\left\{k : \sum_{l=1}^{k} \overline{b}_l \geq 1\right\} \qquad (21a)$$

The above discussion shows that determining the asymptotically optimal rate assignments is in fact no harder than solving a knapsack problem. The only caveat is that the coefficients of the knapsack problem involve various channel and traffic parameters. While the rate sets $R_s$ and the capacity requirements $c_s$ can essentially be thought of as a matter of definition (specification of classes), the corresponding amounts of offered traffic $\rho_s$, would in practice typically involve uncertainty and variation over time, raising measurement-related trade-offs. Instead adaptive, online algorithms may be developed which do not require any explicit knowledge or estimates of the traffic statistics.

Remark 7

Based on the insight into the structure of the optimal solution to linear program LP-UB-D, there are two further trunk reservation type policies that can be shown to be asymptotically optimal, in addition to the complete partitioning and sharing policies identified in the proof of Proposition 3.

Structure of Optimal Solution to CP-UB-C

We now examine the structure of the optimal solution to the convex optimization problem CP-UB-C. In the case that $\Sigma_{s \in S} c_s \rho_s r_s^{max} \leq 1$, the optimal solution is easily seen to be $r_s^* = r_s^{max}$ for all $s \in S$, and we henceforth assume that $\Sigma_{s \in S} c_s \rho_s r_s^{max} > 1$. First of all, observe that the problem may be equivalently expressed as $$\max_{[(y_s)_{s \in S}] \in P_+^{|S|}} \sum_{s \in S} \rho_s V_s(y_s) \qquad (21b)$$

$$sub \sum_{s \in S} \rho_s y_s \leq 1$$

where $V_s(y_s)$ is the optimal value of the optimization problem $$\max_{(a_s, r_s) \in P_+^2} a_s U_s\left(\frac{r_s}{a_s}\right) \qquad (22)$$

$$sub \, a_s r_s^{min} \leq r_s \leq a_s r_s^{max} \qquad (23)$$

$$a_s \leq 1 \qquad (24)$$

$$c_s r_s \leq y_s \qquad (25)$$

Further the function may be defined $$\hat{U}_s(r) = \begin{cases} \frac{r}{r_s^{min}} U_s(r_s^{min}) & r < r_s^{min} \\ U_s(r) & r \geq r_s^{min} \end{cases} \qquad (25a)$$

It may be demonstrated that $V_s(y_s)$ equals the optimal value of the optimization problem:

$$\max_{\hat{r}_s \in P_+} \hat{U}_s(\hat{r}_s) \qquad (26)$$

$$sub \, \hat{r}_s \leq r_s^{max} \qquad (27)$$

$$c_s \hat{r}_s \leq y_s \qquad (28)$$

And, the optimal solution $a_s^*, r_s^*$ of problem (22)-(25) and the optimal solution $\hat{r}_s^*$ of problem (26)-(28) are related as $r_s^* = \max\{r_s^{min}, \hat{r}_s^*\}$, $a_s^* = \min\{1, \hat{r}_s/r_s^{min}\}$. In order to prove this, it may first be noted that, for a given $r$ the objective function (22) is increasing in $a_s$ because the function $U_s(\cdot)$ is concave:

$$\frac{d}{da_s}\left[a_s U_s\left(\frac{r_s}{a_s}\right)\right] = U_s\left(\frac{r_s}{a_s}\right) - \frac{r_s}{a_s} U_s'\left(\frac{r_s}{a_s}\right) \geq 0 \qquad (28a)$$

Thus, for given $r_s$, the objective function is optimized by maximizing $a_s$ subject to the constraints (23) and (24), i.e., taking $a_s = \min\{1, r_s/r_s^{min}\}$, where we invoke the fact that $r_s \leq r_s^{max}$, because otherwise there is no feasible solution. Substitution then shows that the objective function may be written as $\hat{U}_s(r_s)$, and the statement follows.

It may be concluded that the optimization problem CP-UB-C may be equivalently expressed as the optimization problem CP-UB-C-EQ given below $$\max_{[(\hat{r}_s)_{s \in S}] \in P_+^{|S|}} \sum_{s \in S} \rho_s \hat{U}_s(\hat{r}_s) \qquad (29)$$

$$sub \, \hat{r}_s \leq r_s^{max} \; \forall s \in S$$

-continued $$\sum_{s \in S} c_s \rho_s \hat{r}_s \leq 1$$

Given an optimal solution $(r_s')_{s \in S}$, the necessary KKT conditions (which in fact are also sufficient because of the concavity) imply that there exist Lagrange multipliers $\kappa \geq 0$ and $(v_s)_{s \in S} \geq 0$ such that $$\rho_s U_s^{(-)}(r_s') \geq \kappa c_s \rho_s + v_s, \quad (29a)$$

$$\rho_s U_s^{(+)}(r_s') \leq \kappa c_s \rho_s + v_s, \quad (29b)$$

$$\kappa \left( \sum_{s \in S} c_s \rho_s r_s' - 1 \right) = 0, \quad (29c)$$

$$v_s(r_s' - r_s^{max}) = 0, \quad (29d)$$

Where $U_s^{(-)}(\cdot)$ and $U_s^{(+)}(\cdot)$ denote the left- and right-derivatives of the function $U_s(\cdot)$, respectively.

The various classes may now be partitioned into four categories:

(i) $s \in S_1$, with $r_s' < r_s^{min}$, so that $a_s = r_s'/r_s^{min}$, $r_s = r_s^{min}$,
$v_s = 0$, and $\hat{U}_s(r_s') = U_s(r_s^{min})/r_s^{min} = \kappa c_s$; (29e)

(ii) $s \in S_2$, with $r_s' = r_s^{min}$, so that $a_s = 1$, $r_s = r_s^{min}$, $v_s = 0$,
and $\hat{U}_s^{(+)}(r_s^{min}) = U_s(r_s^{min}) \leq \kappa c_s \leq \hat{U}_s^{(-)}(r_s^{min}) = U_s(r_s^{min})/r_s^{min}$; (29f)

(iii) $s \in S_3$, with $r_s' \in (r_s^{min}, r_s^{max})$, so that $a_s = 1$, $r_s = r_s'$,
$v_s = 0$, and $\hat{U}_s(r_s') = U_s(r_s') = \kappa c_s$; (29g)

(iv) $s \in S_4$, with $r_s' = r_s^{max}$, so that $a_s = 1$, $r_s = r_s^{max}$, and
$\hat{U}_s(r_s') = U_s(r_s) \geq \kappa c_s$. (29h)

Section VI

Design of Adaptive Rate Allocation Policies

We now discuss how the insights in the structural properties of the optimal solutions to the linear program LP-UB-D and the convex optimization problem CP-UB-C can be leveraged to design adaptive, online rate assignment algorithms.

Subsection A. "Scenario D" (Discrete Rate)

Sub-subsection A1. Preliminary Results:

First using the structural properties (obtained in the section 'Structure of optimal solution to LP-UB-D', above) to establish that the asymptotically optimal rate assignment fractions $f_{sr}^*$ only depend on the offered traffic through a single scalar variable $\theta^*$. This fact will play an instrumental role in the design of adaptive rate assignment algorithms.

Let $G(\cdot)$ be a function on W (as defined in the section 'Structure of optimal solution to LP-UB-D,' above) of the form:

$$G(w) = h_0 + \sum_{k=1}^{K_R} h_k(w_k), \quad (29i)$$

Where $h_0$ is a constant coefficient and each of the functions $h_k(\cdot)$ is strictly decreasing and continuous. Further denote $\theta_{min} = G(1_{K_R}) = h_0 + \sum_{k=1}^{K_R} h_k(1)$ and $\theta_{max} = G(1_0) = h_0 + \sum_{k=1}^{K_R} h_k(0)$, where $1_k$ is the $K_R$-dimensional vector whose first k components are 1 and whose remaining $K_R - k$ components are 0, $k = 0, \ldots, K_R$.

Lemma 3

The function $G(\cdot)$ is injective, i.e., for any $\theta \in [\theta_{min}, \theta_{max}]$, there exists a unique $w(\theta) = G^{-1}(\theta) \in W$ such that $G(w(\theta)) = \theta$, which may be obtained as $$w_k(\theta) = \begin{cases} 1, & k < K(\theta) \\ h_{K(\theta)}^{-1}(\theta - G(1_{K(\theta)}) + h_{K(\theta)}(1)), & k = K(\theta) \\ 0, & k > K(\theta) \end{cases} \quad (29j)$$

with $$K(\theta) = \min\{k : 1 \leq k \leq K_R, G(1_k) \leq \theta\}. \quad (29k)$$

It is easily verified by substitution that $G(w(\mathbf{8}))$ equals $$h_0 + \sum_{k=1}^{K(\theta)-1} h_k(1) + h_{K(\theta)}(h_{K(\theta)}^{-1}(\theta - G(1_{K(\theta)}) + h_{K(\theta)}(1))) + \sum_{k=K(\theta)+1}^{K_R} h_k(0) = h_0 + \sum_{k=1}^{K(\theta)} h_k(1) + \theta - G(1_{K(\theta)}) + \sum_{k=K(\theta)+1}^{K_R} h_k(0) = \theta. \quad (29l)$$

Further observe that any vector $w \in W$, $w \neq w(\theta)$, is either component wise smaller or larger than $w(\theta)$, and strictly so in at least one component. Since each of the functions $h_k(\cdot)$ is strictly decreasing, it then follows that $G(w)$ is either strictly smaller or larger than $G(w(\theta))$, i.e., $G(w) \neq \theta$.

Based on the above lemma, assignment fractions $f_{sr}(\theta)$ may be introduced and defined in terms of the variables $w_k(\theta)$ (similar to the 'Structure of optimal solution to LP-UB-D' section, above). The latter assignment fractions may be interpreted as follows. Users of the class(es) $s \in S$ for which there is an $m_s(\theta) \in \{1, \ldots, M_s\}$ such that $(s, m_s(\theta)) \in \pi_R(K(\theta))$ are either assigned a nominal rate $r_s^{(m_s(\theta))}$ with probability $w_{K(\theta)}(\theta)$ or rate $r_s^{(m_s(\theta)-1)}$ otherwise. Users of all the other classes $s \in S$ are always assigned a nominal rate $r_s^{(m_s(\theta))}$, where $m_s(\theta) = \max\{0\} \cup \{m : 1 \leq m \leq M_s, \pi_R^*s, m) \leq K(\theta)\}$, which may be thought of as the largest rate $r_s^{(m)}$ (or possibly zero) for which the marginal payoff $Q_{sm}$ is sufficiently high.

Defining $L_D(\theta) = \sum_{s \in S} \sum_{r \in R_s} c_s \rho_s f_{sr}(\theta)$ as the 'load' associated with $\theta$, and denoting by $L_D^{max} = \sum_{s \in S} c_s \rho_s r_s^{(M_s)}$ the maximum possible load (i.e., the load if all users were assigned the highest possible rate for their respective classes). Further define $$\theta^* = \min\{\theta \in [\theta_{min}, \theta_{max}] : L_D(\theta) \leq 1\}. \quad (29m)$$

The next lemma collects a few useful properties of the function $L_D(\cdot)$.

Lemma 4:

(i) The function $L_D(\cdot)$ is strictly decreasing and continuous on $[\theta_{min}, \theta_{max}]$, with $L_D(\theta_{min}) = L_D^{max}$ and $L_D(\theta_{max}) = 0$;

(ii) If $L_D^{max} < 1$, then $\theta^* = \theta_{min}$;

(iii) If $L_D^{max} \geq 1$, then $L_D(\theta^*) = 1$. (29n)

Invoking the identity (19), the following may be written $$L_D(\theta) = \sum_{k=1}^{K_R} \bar{b}_k w_k(\theta) \quad (29o)$$

It follows directly from the definition that each of the variables $w_k(\theta)$ is continuous and decreasing in $\theta$, and strictly so for at least one value of k for any θ. This proves Part (i). Parts (ii) and (iii) are direct consequences of Part (i). The next lemma provides a useful optimality result based on Lemmas 2 and 4.

Lemma 5

The variables $f_{sr}(\theta^*)$ constitute an optimal solution to the linear program LP-UB-D.

If $L_D^{max} < 1$, then Part (ii) of Lemma 4 implies that $\theta^* = \theta_{min}$, so that $w_k(\theta^*) = 1$ for all $k=1, \ldots, K_R$. This in turn means that $$f_{sr_s^{(M_s)}}(\theta^*) = 1$$

for all s∈S, which was identified as the optimal solution in this case in section 'Structure of optimal solution to LP-UB-D', described above.

If $L_D^{max} \geq 1$ then Part (iii) of Lemma 4 implies that $L_D(\theta^*) = 1$, which in turn means that $L_D(\theta^*) = 1$. It then follows from Lemma 2 that the variables $f_{sr}(\theta^*)$ are optimal.

Lemma 6

If $L_D^{max} \geq 1$, then $$\theta_0 = Q_{\pi_R^{-1}(K(\theta^*))}$$

is the optimal dual variable corresponding to constraint (7) of the linear program LP-UB-D.

For each s∈S, let $$m_s = \min\{m: f_{sr_s^{(m)}}(\theta^*) > 0\}$$

and $$\eta_s = \begin{cases} 0 & \text{if } \sum_{r \in R_s} f_{sr}(\theta^*) < 1, \\ \rho_s(U_s(r_s^{(m_s)}) - \theta_0 c_s r_s^{(m_s)}) & \text{otherwise.} \end{cases} \quad (29p)$$

We claim that $(\eta_s)_{s \in S}$ and $\theta_0$ are the optimal dual variables corresponding to the constraints (6) and (7), respectively. Indeed, the variables $(\eta_s)_{s \in S}$ and $\theta_0$ are dual feasible, and invoking the definition of $f_{sr}(\theta^*)$ and the fact that $L_D(\theta^*) = 1$, it can be checked that they satisfy the complementary slackness conditions:

$$f_{sr}(\theta^*)(\rho_s U_s(r) - \theta_0 c_s \rho_s r - \eta_s) = 0 \ \forall r \in R_s, \forall s \in S, \quad (29q)$$

$$\theta_0 \left( \sum_{s \in S} \sum_{r \in R_s} c_s r \rho_s f_{sr}(\theta^*) - 1 \right) = 0,$$

$$\eta_s \left( \sum_{r \in R_s} f_{sr}(\theta^*) - 1 \right) = 0 \ \forall s \in S,$$

which in particular means that $\theta_0$ must be optimal.

Sub-Subsection A2. An Adaptive Rate Allocation Scheme: ARA-D

Lemma 5 reduces the problem of determining the asymptotically optimal rate assignment fractions to that of finding the value of θ* with associated load $L_D(\theta^*) = 1$. Proceeding to develop an adaptive scheme for performing the latter task in an online manner without any explicit knowledge of the amounts of offered traffic $\rho_s$, for convenience we take the function G(•) to be affine, with $h_0 = Q_R(0) > Q_R(1)$ and $$h_k(w_k) = w_k(Q_R(k) - Q_R(k-1)) \quad (29r)$$

Where $Q_R(k) = Q(s,m)$ for $(s,m) \in \pi_R^{-1}(k)$, $1 \leq k \leq K_R$. In particular, $\theta_{min} = G(1_{K_R}) = Q_R(K_R)$ and $\theta_{max} = G(1_0) = Q_R(0)$. We henceforth make the further natural assumption that any rates that cannot possibly be supported have been removed from the rate sets, i.e., $r_s^{(M_s)} \leq p_s$, for all s∈S. The main thrust of the adaptive scheme is to treat θ as a control parameter and use estimates of $L_D(\theta)$ to drive it towards the value θ* for which $L_D(\theta^*) = 1$. There are obviously various potential ways in which the value of θ can be adapted and in which $L_D(\theta)$ can be estimated. The specific scheme that we develop below, termed ARA-D, has the key advantage that it naturally extends to scenarios where no discrete user classes are specified.

The ARA-D scheme is comprised of two closely coupled components: the rate assignment component ARA-DR(θ) and the θ-learning component ARA-DA. The ARA-DR(θ) component uses the θ values produced by the ARA-DA component to assign a nominal rate to each arriving user. In turn, the ARA-DA component adapts the θ values based on observations of the occupancy state generated by the rate decisions of the ARA-DR(θ) component, and serves to find the value θ* for which $L_D(\theta^*) = 1$.

We now proceed to describe both components of the ARA-D scheme in more detail. Denote by $N_{sr}(t)$ the number of class-s users provided rate r in the system at time t. Defining the free capacity at time t as $$m(t) = 1 - \sum_{s \in S} \sum_{r \in R_s} c_s r N_{sr}(t). \quad (29s)$$

Rate Assignment Component: ARA-DR(θ)

Given the value of the control parameter θ, ARA-DR(θ) assigns an arriving class-s user a nominal rate r∈$R_s$ with probability $f_{sr}(\theta)$ as defined previously. Denote by $\theta_i$ the value of θ used for the i-th arriving user with arrival epoch $\tau_i$, and denote by $R_i$ the nominal rate assigned to that user. If R is either zero or larger than the capacity constraint allows for, i.e., $c_{s(i)} R_i > m(\tau_i^-)$, then the ith user is blocked, i.e., $r_i(t) = 0$ for all $t \in [\tau_i, \tau_i + \sigma_i]$. Otherwise, the ith user is admitted and provided rate $R_i$ for its entire duration.

Note that the assignment fractions $f_{sr}(\theta)$ can be efficiently calculated given the value of θ for the above choice of G(•). Specifically, we have $K_R(\theta) = \min\{1 \leq k \leq K_R : Q_R(k)\}$. Users of the class(es) s∈S for which there is an $m_s(\theta) \in \{1, \ldots, M_s\}$ such that $(s, m_s(\theta)) \in \pi_R^-(K_R(\theta))$, are either assigned a nominal rate $r_s^{(m_s(\theta))}$ with probability $$\frac{Q_R(K_R(\theta) - 1) - \theta}{Q_R(K_R(\theta) - 1) - Q_R(K_R(\theta))} \quad (29t)$$

or rate $r_s^{(m_s(\theta)-1)}$ otherwise. Users of all the other classes s∈S are always assigned a nominal rate $r_s^{(m_s(\theta))}$, where $m_s(\theta) = \max\{0\} \cup \{m: 1 \leq m \leq M, Q_{sm} > \theta\}$, i.e., the largest rate $r_s^{(m)}$ (or possibly zero) for which the marginal payoff $Q_{sm}$ is strictly higher than θ, or equivalently $Q_R(K_R(\theta))$.

Adaptive Learning Component: ARA-DA

The role of ARA-DA is to use estimates of $L_D(\theta)$ to adapt the control parameter θ and drive it to the value θ* such that $L_D(\theta^*)=1$. The key challenge here is that the occupancy state only provides an indication of the carried traffic, and that blocking must be properly taken into account to obtain an (unbiased) estimate of the actual offered traffic. In order to achieve that, a tagging procedure may be used, involving tagging the ith user when the free capacity $m(\tau_i^-)$ at the arrival epoch of that user is larger than $m_{min}=\max_{s \in S} c_s r_s^{(M_s)} \le 1$. This choice implies that tagging is independent of the class of a user, and that every user that gets tagged will either be admitted, or assigned a zero rate and be blocked. In other words, blocked users with non-zero nominal rate assignments will never be tagged. This ensures that the nominal rates assigned to tagged users can be tracked without having to monitor blocked users.

Letting the 0-1 variable $\hat{T}_i = I_{\{m(\tau_i^-) \ge m_{min}\}}$ indicate whether the ith user is tagged or not, and denoting by $\hat{N}_{sr}(t)$ the number of tagged class-s users provided rate r at time t, the load associated with tagged users at time t may be defined as $$\hat{n}(t) = \sum_{s \in S} \sum_{r \in R_s} c_s r \hat{N}_{sr}(t), \tag{29u}$$

This may be readily calculated without maintaining any detailed state information or tracking blocked users.

When the jth user arrives, ARA-DA computes the value $\theta_{j+1}$ as follows $$\theta_{j+1} = [\theta_j + \epsilon(\hat{n}(\tau_j^-) - \hat{T}_j)]_{\theta_{min}}^{\theta_{max}} \tag{30}$$

With step size $\epsilon > 0$, an arbitrary initial value $\theta_1$, and $[x]_a^b$ equal to a, x or b if $x<a$, $a \le x \le b$ or $x>b$, respectively. Although the value of $\theta_{j+1}$ is already known at the time of the arrival of the jth user, it is worth stressing that ARA-DR 'lags' by one time step, in the sense that the value of $\theta_j$ is used for its nominal rate assignment.

As may be recognized in the update rule (30), ARA-DA balances the load associated with the tagged users with the fraction of users which are tagged. This, in turn, steers the load of the system to unity and drives the value of $\theta$ to $\theta^*$, as will be proved next under some suitable assumptions.

Convergence Proof

By making Assumption A2 (Poisson arrival processes) and a slightly strengthened version of Assumption B, namely that the service times of the various users are independent and have phase-type distributions, the class of phase-type distributions is well-known to be dense in the set of all distributions for positive random variables.

In order to establish convergence, the stationary behavior of the system if it operated under ARA-DR($\theta$) with a fixed value $\theta$ may be considered. Specifically, let $\hat{a}(\theta)$ be the fraction of users which get tagged and let $(N_{sr}^\theta)_{s \in S, r \in R_s}$ be a random vector with the stationary distribution of the occupancy state. Then the PASTA property implies $$\hat{a}(\theta) = \lim_{J \to \infty} \frac{\sum_{j=1}^{J} \hat{T}_j}{J} = P\left[\sum_{s \in S} \sum_{r \in R_s} c_s r N_{sr}^\theta r \le 1 - m_{min}\right] \tag{31}$$

Considering the following projected ordinary differential equation (see a well-known method, in Section 4.3 of H. J. Kushner, G. G. Yin (2003), Stochastic Approximation and Recursive Algorithms and Applications; referred to in the remainder of this specification as "Kushner & Yin") which captures the smoothened evolution of $\{\theta_j\}_{j \ge 1}$ under the update rule (30):

$$\frac{d\theta(t)}{dt} = \hat{a}(\theta(t))(L_D(\theta(t)) - 1) + z(\theta(t)) \tag{32}$$

where z(theta) is determined as $$\begin{cases} -\hat{a}(\theta_{min})(L_D(\theta_{min}) - 1) & \text{if } L_D(\theta_{min}) < 1, \theta = \theta_{min}; \\ 0 & \text{otherwise.} \end{cases} \tag{32a}$$

Note that $[L_D(\theta)-1]^+$ may be interpreted as the excess load when operating under a fixed value $\theta$. For each t, the function z(t) is nonnegative, and guarantees that $$\frac{d\theta(t)}{dt} \ge 0$$

for $\theta(t)=\theta_{min}$, thus ensuring that $\theta(t)$, like $\theta_j$, cannot fall below $\theta_{min}$.

Lemma 7

For any initial value $\theta(0) \in [\theta_{min}, \theta_{max}]$, $$\lim_{t \to \infty} \theta(t) = \theta^* \tag{32b}$$

Note that the ODE in (32) is well posed, as follows from the well-known solution to the ODE (see Theorem 4.1 of Chapter 8 of Kushner & Yin).

Consider the following (Lyapunov) function $$V(\theta) = \frac{1}{2}(\theta - \theta^*)^2 \tag{32c}$$

Since $(\theta_{min} - \theta^*) z(\theta_{min}) \le 0$, $$\frac{dV(\theta(t))}{dt} \le -\hat{a}(\theta(t))(\theta(t) - \theta^*)(L_D(\theta(t)) - 1) \tag{33}$$

It follows from Lemma 4 that $L_D(\theta)-1$ is either strictly negative or strictly positive when $\theta$ is larger or smaller than $\theta^*$, respectively, and hence $(\theta(t)-\theta^*)(L_D(\theta(t))-1)<0$ as long as $\theta(t) \ne \theta^*$. Noting that $\hat{a}(\theta) > 0$, we conclude that $$\frac{dV(\theta(t))}{dt} \begin{cases} = 0, & \theta = \theta^* \\ < 0, & \theta \ne \theta^* \end{cases} \tag{33a}$$

In order to complete the proof, it suffices to verify that the functions $L_D(\cdot)$ and $\hat{a}(\cdot)$ (appearing in the upper bound (33) for $$\left. \frac{dV(\theta(t))}{dt} \right)$$

are continuous. It follows from Lemma 4 that the function $L_D(\bullet)$ is continuous, so it only remains to be established that $\hat{a}(\bullet)$ is a continuous function. Using (31), we can conclude that $\hat{a}(\theta)$ is a linear function of the distribution of $(N_{sr}^\theta)_{s \in S, r \in R}$. Since the service times of the various users have phase-type distributions, the system behavior can be described as a finite irreducible Markov process. Further, the transition rate matrix associated with this Markov process is a piecewise linear function of $\theta$. Then, using the well-known perturbation bound (given in Section 3.1 of G. E. Cho, C. D. Meyer (2001), Comparison of Perturbation Bounds for the Stationary Distribution of Markov Chain, Lin. Alg. Appl. 335 (1-3), 137-150; referred to herein as "Cho & Meyer"), it may be concluded that the stationary distribution of this Markov process is a continuous function of $\theta$. Using this observation, we conclude that $\hat{a}(\bullet)$ is a continuous function.

The next theorem states that for a small enough step size $\epsilon$ and sufficiently large number of iterates, virtually all of the iterates obtained by the ARA-D scheme will belong to an arbitrarily close neighborhood of $\theta^*$.

Theorem 1

For any $\delta_\theta > 0$, the fraction of iterates $(\theta_j)_{1 \le j \le T/\epsilon}$ that take values in $(\theta^* - \delta_\theta, \theta^* + \delta_\theta)$ goes to one in probability as $\epsilon \downarrow 0$ and $T \to \infty$.

The result follows from the well-known Theorem 4.1 (in Chapter 8 of Kushner & Yin) and the asymptotic stability of $\theta^*$ established in Lemma 7 once we have verified that all the conditions of Theorem 4.1 are satisfied in the present setting.

The set H, the variables $\theta_j^\epsilon$, $Y_j^\epsilon$, $Z_j^\epsilon$, $\xi_j^\epsilon$, and the sigma algebra $F_j^\epsilon$ used in the exposition of Theorem 4.1 (Kushner & Yin) correspond to certain variables in the present setting as described next. To see the correspondence, it will be helpful to compare the update rule (30) repeated below $$\theta_{j+1} = [\theta_j + \epsilon(\hat{n}(\tau_j^-) - \hat{T}_j)]_{\theta_{min}}^{\theta_{max}} \qquad (33b)$$

against the update rule considered in Theorem 4.1 (Kushner & Yin) stated below $$\theta_{j+1}^\epsilon = \Pi_H(\theta_j^\epsilon + \epsilon Y_j^\epsilon) = \theta_j^\epsilon + \epsilon(Y_j^\epsilon + Z_j^\epsilon). \qquad (33c)$$

Also, note that the decision for the jth user depends only on $\theta_j$ and the free capacity just before its arrival.

In the present setting $H = [\theta_{min}, \theta_{max}]$, and the variables $\theta_j^\epsilon$ correspond to the variables $\theta_j$. Also, for each j, $$Y_j^\epsilon = \hat{n}(\tau_j^-) - \hat{T}_j, \qquad (33d)$$

while $$Z_j^\epsilon = \begin{cases} \dfrac{\theta_{min} - \theta_j^\epsilon}{\epsilon} - Y_j^\epsilon, & \text{if } \theta_j^\epsilon + \epsilon Y_j^\epsilon < \theta_{min}, \\ \dfrac{\theta_{max} - \theta_j^\epsilon}{\epsilon} - Y_j^\epsilon, & \text{if } \theta_j^\epsilon + \epsilon Y_j^\epsilon > \theta_{max}, \\ 0, & \text{otherwise.} \end{cases} \qquad (33e)$$

Note that $Z_j^\epsilon$ plays a role similar to that of $z(\bullet)$ in (32). The 'memory' random variables $\xi_j^\epsilon$ correspond to $$(N_{sr}(\tau_j^-), \hat{N}_{sr}(\tau_j^-))_{s \in S, r \in R_s} \qquad (33f)$$

Let $F_j^\epsilon$ be a sigma algebra that measures at least $\{\theta_i^\epsilon, Y_{i-1}^\epsilon, \xi_i^\epsilon, i \le j\}$ for each j, and let $E_j^\epsilon[\bullet]$ denote the expectation with respect to $F_j^\epsilon$.

Next, the conditions (A1.1), (A1.4), (A1.5), (A1.7), (A4.1)-(A4.7) and (A4.3.1) stated in Theorem 4.1 (Kushner & Yin) as sufficient conditions are satisfied in the present setting. Condition (A1.1) (uniform integrability of $\{Y_j^\epsilon : \epsilon, j\}$) is satisfied since $N_{sr}$ is bounded from above, and $\hat{N}_{sr} \le N_{sr}$ for each $s \in S, r \in R_s$. Conditions (A1.4) and (A1.5) are satisfied if we let $\beta_j^\epsilon = 0$ and $g_j^\epsilon(\theta, \xi) = g(\theta, \xi)$ for each j, where $$g(\theta, \xi) = \sum_{s \in S} \sum_{r \in R_s} c_s \hat{N}_{sr} r - \hat{T}_j, \qquad (34)$$

$$\text{for } \xi = (N_{sr}, \hat{N}_{sr})_{s \in S, r \in R_s} \qquad (34a)$$

Condition (A1.7) is satisfied due to the boundedness of $$(N_{sr}(\bullet), \hat{N}_{sr}(\bullet))_{s \in S, r \in R_s} \qquad (34b)$$

Condition (A4.1) holds since we can define the transition function $P_j^\epsilon(\bullet, \bullet | \theta)$ using the rules for admitting and tagging users, satisfying:

$$P_j^\epsilon(\xi_{j+1}^\epsilon \in \bullet |) = P_j^\epsilon(\xi_j^\epsilon, \bullet | \theta_j^\epsilon), \qquad (34c)$$

Provided the service times are exponentially distributed. When the service times have phase-type distributions, the above arguments can be generalized by appropriately modifying the memory variables to account for (a finite number of) phases involved in each service. Hence $\xi_{j+1} = (N_{sr}(\tau_{j+1}^-), \hat{N}_{sr}(\tau_{j+1}^-))_{s \in S, r \in R_s}$ 'depends' only on $\xi_j$, and the decision for the jth user which depends only on $\theta_j$ and $\xi_j$. Also, note that $P_j^\epsilon(\bullet, \bullet | \theta)$ is measurable since the probability transition function is continuous in $\xi_j^\epsilon$ and $\theta_j^\epsilon$. Condition (A4.2) is satisfied since the transition function $P_j^\epsilon(\bullet, \bullet | \theta)$ is independent of j and $\epsilon$. Condition (A4.3) holds since the probability transition function $P_j^\epsilon(\bullet, \bullet | \theta)$ is continuous in $\xi_j^\epsilon$ and $\theta_j^\epsilon$. Condition (A4.4) is satisfied because $g(\theta, \xi)$ defined in (34) is continuous in $\theta$ and $\xi$. In addition, $(\xi_j(\theta) : j \ge i)$ is the process evolving under a fixed value $\theta$ with initial condition $\xi_i(\theta) = \xi_i$. Condition (A4.5) holds since $g(\theta, \xi)$ is bounded. Condition (A4.6) is satisfied (because $(\xi_j(\theta) : j \ge i)$ is a stationary Markov process) if we take:

$$\bar{g}(\theta) = \hat{a}(\theta)(L_D(\theta) - 1). \qquad (34d)$$

Also, note that $\bar{g}(\theta)$ can be viewed as the expected value of (34) if the occupancy processes were stationary, and evolved under a fixed value $\theta$. Condition (A4.7) holds since $\xi_j^\epsilon$ is bounded.

Thus, we have verified that all the conditions stated in Theorem 4.1 (Kushner & Yin) are satisfied.

Next, we consider a modification of the ARA-DA scheme, termed ARA-DA-DSZ, which uses decreasing step sizes instead of the constant step size $\epsilon$ used in (30). When the jth user arrives, ARA-DA-DSZ computes the value $\theta_{j+1}$ as follows:

$$\theta_{j+1} = [\theta_j + \epsilon_j(\hat{n}(\tau_j^-) - \hat{T}_j)]_{\theta_{min}}^{\theta_{max}} \qquad (34e)$$

The step size sequence $(\epsilon_j)_{j \ge 1}$ satisfies the conditions (DSZ.1)-(DSZ.2) listed below.

(DSZ.1) $\epsilon_j \ge 0$ for each j, $\lim_{j \to \infty} \epsilon_j = 0$ and $\Sigma_{j=1}^\infty \epsilon_j = \infty$ \qquad (34f)

(DSZ.2) There is a sequence of integers $(\alpha_j)_{j \ge 1}$ converging to infinity such that $$\lim_j \sup_{0 \le j' \le \alpha_j} \left| \frac{\epsilon_{j+j'}}{\epsilon_j} - 1 \right| = 0 \qquad (34g)$$

Note that (DSZ.2) requires that the step sizes change slowly. The sequence $(\epsilon_j)_{j\geq 1}$ with $$\varepsilon_j = \frac{1}{j}$$

satisfies conditions (DSZ.1)-(DSZ.2).

The next result states that for ARA-D with the component ARA-DA replaced with ARA-DA-DSZ, almost all the iterates obtained will belong to an arbitrarily close neighborhood of $\theta^*$. Let $t_0=0$ and $t_j=\Sigma_{j'=0}^{j-1}\epsilon_{j'}$. Let $\omega(t)$ be the value of j such that $t_j \leq t < t_{j+1}$.

Theorem 2

For any $\delta_\theta > 0$, the fraction of iterates $(\theta_j)_{1 \leq j \leq \omega(T)}$ that take values in $(\theta^*-\delta_\theta, \theta^*+\delta_\theta)$ goes to one in probability as $T \to \infty$.

The result follows from well-known Theorem 4.3 (Chapter 8 of Kushner & Yin) and the asymptotic stability of $\theta^*$ established in Lemma 7 once we have verified that all the conditions of Theorem 4.3 are satisfied in the present setting.

The conditions (5.1.1) and (A2.8) of well-known Theorem 4.3 are satisfied since the step size sequence $(\epsilon_j)_{j\geq 1}$ satisfies (DSZ.1)-(DSZ.2). We can verify that the conditions (A2.1), (A2.2), (A2.4), (A2.6), (A4.3), (A4.7), (A4.8), (A4.9), (A4.10), (A4.11), (A4.12) and (A4.3.1) given in well-known Theorem 4.3 are satisfied by using arguments identical or quite similar to those used in the proof of well-known Theorem 1 (Kushner & Yin) for verifying (A1.1), (A1.5), (A1.7), (A1.4), (A4.3), (A4.7), (A4.1), (A4.2), (A4.4), (A4.5), (A4.6) and (A4.3.1), respectively.

Subsection B. "Scenario C"

We first use the structural properties obtained in section 'Structure of optimal solution to CP-UB-C' (above) to establish that the asymptotically optimal rate assignments only depend on the offered traffic through a single scalar variable $\theta^*$, which in fact corresponds to the Lagrange multiplier associated with the capacity constraint (29). This fact will play an instrumental role in the design of adaptive rate assignment algorithms.

For a given $\theta \in P_+$, define $$r_s^-(\theta) = \sup\{r \in R_s \cup \{0\} : p_s U_s^{(-)}(r) \geq \theta\}, \quad (34h)$$

and $$r_s^+(\theta) = \sup\{r \in R_s \cup \{0\} : p_s U_s^{(-)}(r) \geq \theta\}, \quad (34i)$$

with the convention that $U_s^{(-)}(0)=\infty$ for all $s \in S$, ensuring that $r_s^-(\theta)$ and $r_s^+(\theta)$ are well-defined for all $\theta \in P_+$.

Note that $U_s^{(-)}(r)=U_s(r_s^{min})/r_s^{min}$ for all $r \in (0, r_s^{min}]$ and equals the left derivative of $U_s(\cdot)$ for all $r \in (r_s^{min}, r_s^{max}]$, so $$r_s^-(\theta)=r_s^+(\theta)=0 \text{ if } \theta > p_s U_s^{(-)}(r_s^{min}), \quad (34j)$$

$$r_s^-(\theta)=0, r_s^+(\theta)=r_s^{min} \text{ if } \theta=p_s U_s^{(-)}(r_s^{min}), \quad (34k)$$

and $$r_s^-(\theta)=r_s^+(\theta)=r_s^{max} \text{ if } 0 \leq \theta \leq p_s U_s^{(-)}(r_s^{max}). \quad (34l)$$

In case $U_s^{(-)}(\cdot)$ is strictly decreasing on $(r_s^{min}, r_s^{max}]$, i.e., $U_s(\cdot)$ is strictly concave, we have $r_s^-(\theta)=r_s^+(\theta)$ for all $\theta \in p_s$ $(U_s^{(-)}(r_s^{max}), U_s^{(-)}(r_s^{min}))$, and let $$r_s^0(\theta)=r_s^-(\theta)=r_s^+(\theta) \quad (34m)$$

If in addition the left- and right-derivatives of $U_s(\cdot)$ are equal, i.e., $U_s(\cdot)$ exists and is continuous, then we must have $p_s U_s'(r_s^0(\theta))=\theta$. Define $L_C^-(\theta)=\Sigma_{s \in S} c_s \rho_s r_s^-(\theta)$ and $L_C^+(\theta)=\Sigma_{s \in S} c_s \rho_s r_s^+(\theta)$ as the lower and upper 'load' values associated with $\theta$. Denote by $L_C^{max}=\Sigma_{s \in S} c_s \rho_s r_s^{max}$ the maximum possible load, i.e., the load if all users were assigned the highest possible rate for their respective classes. Further define $$\theta^*=\inf\{\theta \in P_+ : L_C^-(\theta) \leq 1\}, \quad (34n)$$

so that $\theta^*=0$ when $L_C^{max} \leq 1$. When $L_C^{max} > 1$, $\theta^*$ may be equivalently defined as $\theta^*=\sup\{\theta \in P_+ : L_C^+(\theta) \geq 1\}$.

The next lemma provides a useful optimality result.

Lemma 8:

Let $\hat{r}_s(\theta^*) \in [r_s^-(\theta^*), r_s^+(\theta^*)]$, with the further property that $\Sigma_{s \in S} \rho_s c_s \hat{r}_s(\theta^*)=1$ in case $L_C^{max} \geq 1$.

Then the variables $(\hat{r}_s(\theta^*))_{s \in S}$ constitute an optimal solution to the problem CP-UB-C-EQ, and $\theta^*$ is the optimal Lagrange multiplier associated with the capacity constraint (29).

If $L_C^{max} < 1$, then $\theta^*=0$, so that $\hat{r}_s(\theta)=r_s(\theta^*)=r_s^{max}$ for all $s \in S$, which was identified as the optimal solution in this case in section 'Structure of optimal solution to CP-UB-C' (above). It is also easily seen that the optimal Lagrange multiplier equals 0 in this case.

By construction and the fact that $\Sigma_{s \in S} \rho_s c_s \hat{r}_s(\theta^*)=1$, the variables $\hat{r}_s(\theta^*)$ constitute a feasible solution. In order to prove optimality, for each $s \in S$ let $$v_s = \begin{cases} 0 & \text{if } \hat{r}_s(\theta^*) < r_s^{max}, \\ \rho_s(U_s^{(-)}(\hat{r}_s(\theta^*)) - \theta^* c_s) \geq 0 & \text{if } \hat{r}_s(\theta^*) = r_s^{max}. \end{cases} \quad (34o)$$

Where $(v_s)_{s \in S}$ and $\theta^*$ are the optimal Lagrange multipliers associated with CP-UB-C-EQ. Indeed, it is easily verified that the necessary KKT conditions are satisfied by construction, and hence the variables $\hat{r}_s(\theta^*)$ in fact constitute an optimal solution.

While the variables $(\hat{r}_s(\theta^*))_{s \in S}$ in the above lemma constitute an optimal solution to the problem CP-UB-C-EQ, it is important to observe it may occur that $\hat{r}_s(\theta^*) \in (0, r_s^{min})$, meaning that these variables may not directly provide feasible rate assignments. As the next lemma states, however, the same expected utility can be obtained through a probabilistic scheme, which only uses rate assignments $r_s^-(\theta^*)$ and $r_s^+(\theta^*)$ which are feasible by definition.

Lemma 9:

If $\hat{r}_s(\theta^*) \in (r_s^-(\theta^*), r_s^+(\theta^*))$, then $$\hat{U}_s(\hat{r}_s(\theta^*)) = q_s(\theta^*) U_s(r_s^-(\theta^*)) + (1 - q_s(\theta^*)) U_s(r_s^+(\theta^*)), \quad (34p)$$

with $$q_s(\theta^*) = \frac{r_s^+(\theta^*) - \hat{r}_s(\theta^*)}{r_s^+(\theta^*) - r_s^-(\theta^*)} \in [0, 1] \quad (34q)$$

Lemmas 8 and 9 reduce the problem of determining the asymptotically optimal rate assignments to that of finding the value of $\theta^*$. It is worth observing here that the existence of $\hat{r}_s(\theta^*) \in [r_s^-(\theta^*), r_s^+(\theta^*)]$, satisfying $\Sigma_{s \in S} \rho_s c_s \hat{r}_s(\theta^*)=1$ is ensured by that fact that $L_C^-(\theta^*) \geq 1 \geq L_C^+(\theta^*)$ in case $L_C^{max} \geq 1$.

In developing an adaptive scheme, termed ARA-C, for finding the value of $\theta^*$ in an online manner without any explicit knowledge of the amounts of offered traffic $\rho_s$, the further natural assumption is made that any rates that cannot possibly be supported have been removed from the rate sets, i.e., $r_s^{max} \geq \rho_s$ for all $s \in S$.

The main thrust of the adaptive scheme is to treat $\theta$ as a control parameter and use estimates of $L_C(\theta)$ to drive it towards the value $\theta^*$. Specifically, the ARA-C scheme is comprised of two closely coupled components: the rate assignment component ARA-CR($\theta$) and the $\theta$-learning component ARA-CA. The ARA-CR($\theta$) component uses the $\theta$ values produced by the ARA-CA component to assign a nominal rate to each arriving user. In turn, the ARA-CA component adapts the $\theta$ values based on observations of the occupancy state generated by the rate decisions of the ARA-CR($\theta$) component, and serves to find the value $\theta^*$.

Proceeding to describe both components of the ARA-C scheme in more detail, the free capacity in the system at time t may be defined as:

$$m(t) = 1 - \sum_{i=1}^{\infty} c_{s(i)} r_i(t). \tag{34r}$$

ARA-CR($\theta$)

Given the value of the control parameter $\theta$, ARA-CR($\theta$) assigns an arriving class-s user a nominal rate $r_s^-(\theta)$. Note that the nominal rate assignment can be computed even more easily than in the case of ARA-DR($\theta$), and does not even require any knowledge of the capacity requirements of any other classes. In fact, ARA-CR($\theta$) can be readily applied to assign nominal rates to individual users when there are no classes defined. In addition, ARA-CR($\theta$) can be applied in the case of discrete rate sets in section 'Alternative schemes for Scenario D: ARA-A' (above), when we use a linear interpolation of the utility function, which will always result in $r_s^-(\theta)$ belonging to $R_s$ (or being 0). Denote by $\theta_i$ the value of $\theta$ used for the ith arriving user with arrival epoch $\tau_i$, and denote by $R_i$ the nominal rate assigned to that user. If $R_i$ is either zero or larger than the capacity constraint allows for, i.e., $c_{s(i)}R_i \geq m$ ($\tau_i^-$), then the ith user is blocked, i.e., $r_i(t)=0$ for all $t \in [\tau_i, \tau_i + \sigma_i]$. Otherwise, the ith user is admitted and provided rate $R_i$ for its entire duration. Thus, the free capacity in the system at time t may be expressed as $$m(t) = 1 - \sum_{i=1}^{\infty} c_{s(i)} R_i A_i I_{\{\tau_i \leq t \leq \tau_i + \sigma_i\}}, \tag{34s}$$

Where the 0-1 variable $A_i = I_{\{m(\tau_i^-) \geq m_{min}\}}$ indicates whether the ith user is admitted or not.

ARA-CA

The role of ARA-CA is to use estimates of $L_C(\theta)$ to adapt the control parameter $\theta$ and drive it to the value $\theta^*$. ARA-CA operates in a similar fashion as ARA-DA, and in particular uses a similar tagging procedure, where the ith user is tagged when the free capacity $m(\tau_i^-)$ at the arrival epoch of that user is larger than $m_{min} = \max_{s \in S} c_s r_s^{max} \geq 1$. Just like before, this choice implies that tagging is independent of the class of a user, and ensures that the nominal rates assigned to tagged users can be tracked without having to monitor blocked users.

Let the 0-1 variable $\hat{T}_i = I_{\{m(\tau_i^-) \geq m_{min}\}}$ indicate whether the ith user is tagged or not. Define the load associated with tagged users at time t as $$\hat{n}(t) = \sum_{i=1}^{\infty} c_{s(i)} R_i \hat{T}_i I_{\{\tau_i \leq t \leq \tau_i + \sigma_i\}}, \tag{34t}$$

This can be readily calculated without maintaining any detailed state information or tracking blocked users.

When the jth user arrives, ARA-DA computes the value $\theta_{j+1}$ according to the exact same update rule (30), as ARA-CA, except that the term $\hat{n}(\tau_j^-)$ is now calculated from the above formula. Although the value of $\theta_{j+1}$ is already known at the time of the arrival of the jth user, it is worth stressing that ARA-DR 'lags' by one time step, in the sense that the value of $\theta_j$ is used for its nominal rate assignment.

Just like ARA-CA, ARA-DA balances the load associated with the tagged users with the fraction of users which are tagged. This, in turn, steers the load of the system to unity in a certain sense and drives the value of $\theta$ to $\theta^*$.

A rigorous convergence proof is however far more complicated than for the ARA-D scheme since the load fails to be continuous as function of the control parameter $\theta$. Note that the nominal rate assignment $r_s^-(\theta)$ for class-s users is discontinuous as it jumps from 0 to $r_s^{min}$ (or higher) around $\theta = p_s U_s^{(-)}(r_s^{min})$, and may have other discontinuity points as well when $U_s(\cdot)$ is not strictly concave. While the nominal rate assignment may be continuous elsewhere, even a slight change could lead to a change in the maximum number of class-s users that can be supported, and hence still cause the load to be discontinuous.

Since the load is discontinuous, the problem departs from the usual assumptions in stochastic approximation, and falls outside the well-know methodological framework of Kushner & Yin. The complications caused by the discontinuity are further exacerbated by the fact that the evolution of the system occupancy under the ARA-C scheme can not be described in terms of a finite-dimensional Markov process because of the continuum of possible rate assignments.

Despite the fundamental obstacles in establishing a rigorous proof, it is expected that the convergence statement of Theorem 1 actually continues to hold for the ARA-D scheme. If convergence occurs, then it must either be the case that $\theta^* \leq \max_{s \in S} p_s U_s^{(-)}(r_s^{max})$, so that $r_s^{(-)}(\theta^*) = r_s^{max}$ all $s \in S$ in case $L_C^{max} < 1$, or in case $L_C^{max} \geq 1$ the observed average load must tend to unity, because otherwise ARA-CA would induce a persistent drift in $\theta$, i.e., it must be the case that $$\sum_{s \in S} \rho_s c_s \bar{r}_s = 1, \tag{34u}$$

with $$\bar{r}_s = \lim_{J \to \infty} \frac{\sum_{j=1}^{J} R_j I_{\{s(j)=s\}}}{\sum_{j=1}^{J} I_{\{s(j)=s\}}} \tag{34v}$$

denoting the long-term average nominal rate assigned to class-s users.

For classes $s \in S$ for which $U_s^{(-)}(\cdot)$ is continuous around $\theta^*$, we simply have $\bar{r}_s = r_s^-(\theta^*)$. For other classes, we will have $\bar{r}_s = q_s r_s^-(\theta^*) + (1 - q_s) r_s^+(\theta^*)$ i.e., $$q_s = \frac{r_s^+(\theta^*) - \bar{r}_s}{r_s^+(\theta^*) - r_s^-(\theta^*)}, \tag{34w}$$

with $$q_s = \lim_{J \to \infty} \frac{\sum_{j=1}^{J} I_{\{\theta_j > \theta^*\}} I_{\{s(j)=s\}}}{\sum_{j=1}^{J} I_{\{s(j)=s\}}} \quad (34x)$$

denoting the long-term fraction of iterates that are (just) above $\theta^*$, i.e., the long-term fraction of class-s users that are assigned a nominal rate $r_s^-(\theta^*)$. In particular, for any class s for which $p_s U_s^{(-)}(r_s^{min}) = \theta^*$, we will have $r_s^-(\theta^*) = 0$, $r_s^{+(\theta^*)} = r_s^{min}$, and $q_s = \bar{r}_s/r_s^{min}$. Lemmas 8 and 9 then imply that the nominal rate assignments coincide with the asymptotically optimal ones.

Alternative Schemes for Scenario D: ARA-A

As noted earlier, under ARA-DR($\theta$) the users of most classes are assigned the largest possible nominal rate for which the marginal payoff is strictly higher than $\theta$, or equivalently $Q_R(K_R(\theta))$. Typically only some users of one particular class receive a larger nominal rate assignment so as to make full use of the available capacity. This is also borne out by the fact that $Q_R(K_R(\theta^*))$ can be shown to be the optimal dual variable corresponding to the capacity constraint (18). This suggests the following somewhat simpler alternative rate assignment scheme, which we will refer to as ARA-AR ($\theta$). Given the value of the control parameter $\theta$, ARA-AR($\theta$) assigns an arriving class-s user a nominal rate 0 if $Q_{s1} < 0$ and $r_s(\theta) = \max\{r_s^{(m)}: Q_{sm} \geq \theta\}$ otherwise. The latter scheme, like ARA-C, has the key advantage that the rate assignment does not involve any parameters of other user classes, and can be applied in conjunction with ARA-DA as described before, yielding the scheme ARA-A. In particular, interpreting $Q_{sm}$ as a left-derivative, ARA-C can be viewed as an extension of ARA-A.

Based upon the understanding of example embodiments described above, FIG. 2 depicts groups of user equipment (UE) 10a/20a in a wireless network 40 interfacing with a base station 30, in accordance with an example embodiment. The base station 30 may include, for example, a data bus 30a, a transmitting unit 30b, a receiving unit 30c, a memory unit 30d, and a processor 30e (see FIG. 3).

The transmitting unit 30b, receiving unit 30c, memory unit 30d, and processor 30e may send data to and/or receive data from one another using the data bus 30a.

The transmitting unit 30b is a device that includes hardware and any necessary software for transmitting signals including, for example, control signals or data signals via one or more wired and/or wireless connections to other network elements in the wireless network 40.

The receiving unit 30c is a device that includes hardware and any necessary software for receiving wireless signals including, for example, control signals or data signals via one or more wired and/or wireless connections to other network elements in the wireless network 40.

The memory unit 30d may be any device capable of storing data including magnetic storage, flash storage, etc.

The processor 30e may be any device capable of processing data including, for example, a microprocessor configured to carry out specific operations based on input data, or capable of executing instructions included in computer readable code including, for example code stored in the memory unit 30d. For example, the processor 30e is capable of implementing a sniffing function which allows the base station 30 to receive data broadcasted by one or more other base stations, for example, by synchronizing with the one or more other base stations in the same known manner as a UE. Further, the processor 30e is capable of analyzing subframes received from another BS in order to estimate which subframes are ABS subframes and which subframes are not.

Figure 3:
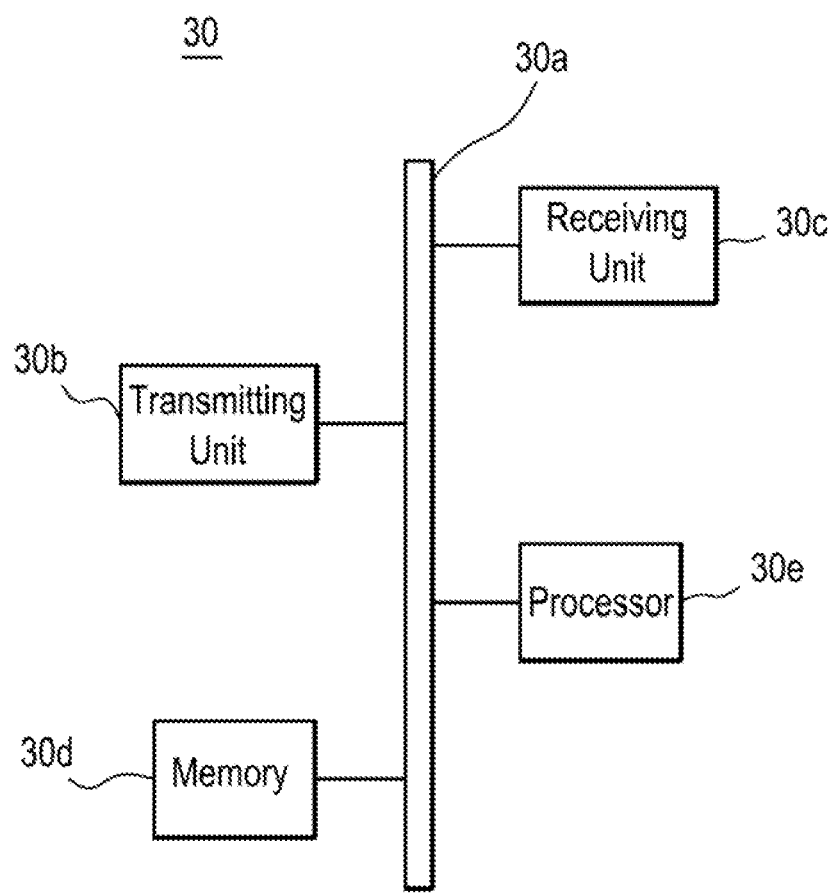
FIG. 3 is a diagram illustrating an example structure of the user equipment (UE), according to an example embodiment.

According to at least some example embodiments, operations described herein as being performed by a base station 30 may be performed by a device having the structure of base station 30 illustrated in FIG. 3. For example, the memory unit 30d may store executable instructions corresponding to each of the operations described with reference to FIG. 4 as being performed by the base station 30. Further, the processor 30e may be configured perform each of the operations described with reference to FIG. 4 as being performed by a base station, for example, by executing executable instructions stored in the memory unit 30d. Further, any other base station (not shown) that may be in the wireless network 40 may also have the structure and/or operation of the base station 30.

Figure 4:
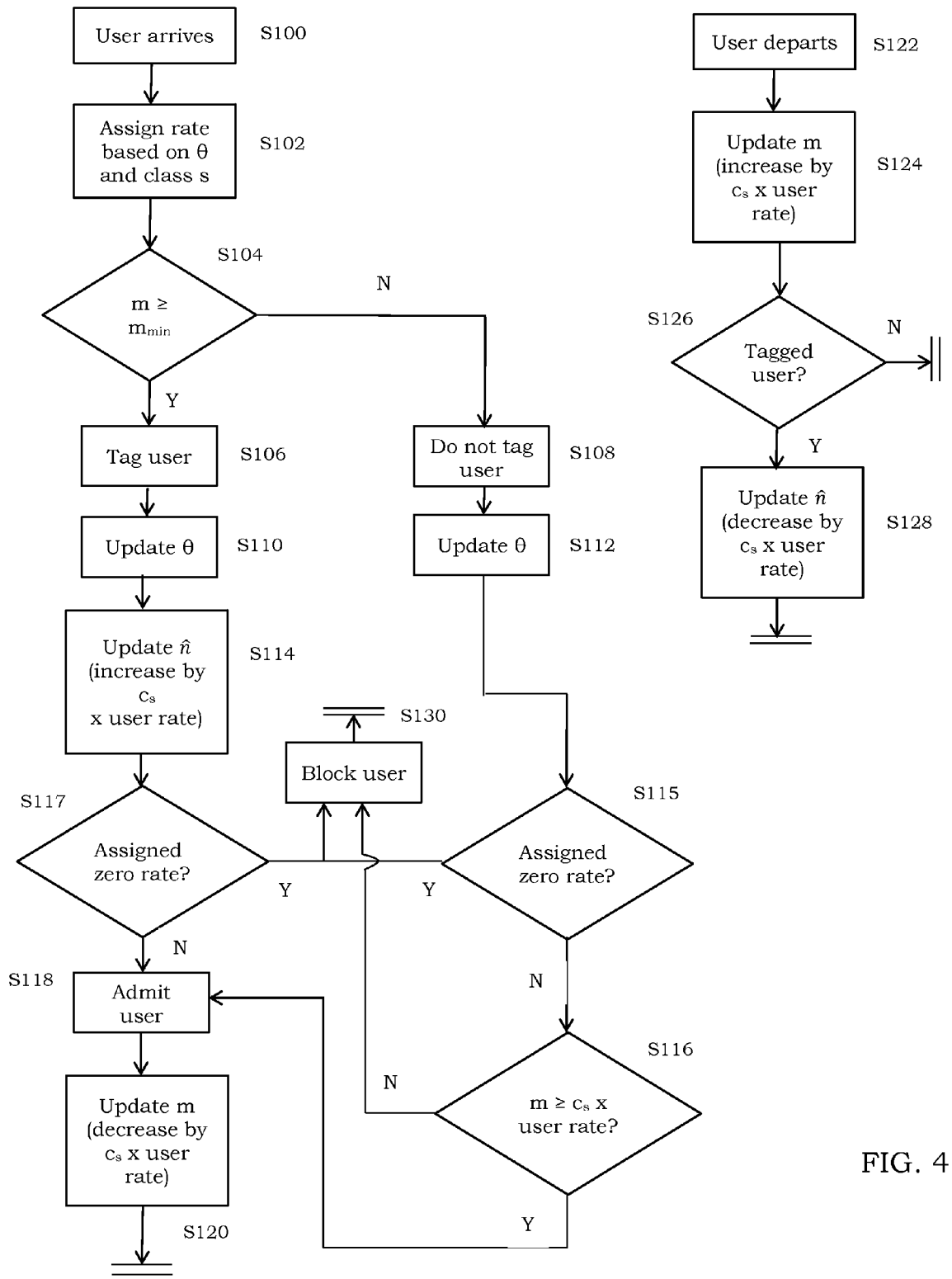
FIG. 4 is a flowchart of a rate allocation method that determines throughput, according to an example embodiment.

Based on the understanding of the network 40, a discussion of an example rate allocation method that determines the aggregate long-term rate utility, as shown in FIG. 4, is described herein. The method of FIG. 4 may be accomplished by the processor 30e that may be located within any network node (such as base station 30) of the wireless network 40. It should be understood that the method of FIG. 4 may be re-initiated each time a user arrives or departs from the network, and therefore, this method may be performed on a continuous basis to continuously refine and adapt the control parameter $\theta$, as described herein. The control parameter $\theta$ may be assigned an arbitrary positive initial value, at the very outset of the method, before the processor 30e initially starts operating. For the purpose of the FIG. 4 discussion, the network is initially assumed to be empty, such that there are no active UEs accessing the network when the processor 30e starts the method shown in FIG. 4. Therefore, the free capacity m (as defined in Equation 29s) is initialized to be unity (i.e., 1, indicating a maximum amount of free capacity being available), and the aggregate load of tagged users n (as defined in Equation 29u) is initialized to 0 (as there are initially no tagged UEs). Also for purposes of the FIG. 4 discussion, it should be understood that this method may be independently applied to each individual sector of a network cell, and therefore, for purposes of this FIG. 4 discussion the term "network" may be equated with the term "network sector."

Discrete Rates ("Scenario D")

In order to fully appreciate the various method steps of FIG. 4, a simplified, illustrative example may be assumed where the network 40 is supporting classes of users (S=4) that may enter and exit the network over time. Class-1 UEs 20a (see FIG. 2) may be located relatively far from serving base station 30, and these UEs may be requesting low-grade video content (e.g., low-motion video on a small screen). For example sake, the possible rate assignments for these class-1 UEs may be assumed to be one of three choices: either 1 Mb/s, or 2 Mb/s, or 0 Mb/s (in the event the processor 30e determines that a user will not be admitted). For the class-1 UEs 20a, users that are assigned the rate of 1 Mb/s will enjoy a corresponding utility level $U_1(1)$ that may be assigned a numerical value of 6. The value of this utility level $U_s(r)$ (which may be any positive value in an unbounded range for a UE class s as function of the service rate r), may be determined by a network operator using any well-known method of quantitatively defining the quality-of-experience (QoE) as perceived by the UEs at a given rate. The relationship between QoE and rate is dependent on content as well as type of UE device (i.e., the value may change based on the viewing of low- or high-quality motion video, whether the UE device has a small or large screen, etc.). Following along with the illustrative example, UEs that are assigned the rate of 2 Mb/s will enjoy a corresponding utility level that may be assigned a numerical value of 8. UEs assigned a zero (0 Mb/s) rate will have a utility level of zero (0). Therefore, a class-1 utility function for the class-1 UEs may be mathematically represented by $U_1(0)=0$, $U_1(1)=6$ and $U_1(2)=8$.

The capacity requirement coefficient $c_s$ is a coefficient that may be assigned to a class of UEs that are collocated together within a network cell, where the capacity requirement coefficient $c_s$ is function of the signal strength that the UE experiences (which depends on the user's proximity to a serving base station along with other propagation conditions). In particular, the capacity requirement coefficient $c_s$ represents the fraction of the total available resources at the serving base station required to support a 1 Mb/s service rate for a single class-s user, and may be measured in units of s/Mb. For example, $c_s=0.1$ s/Mb represents that a fraction 0.1 of the total available resources at the serving base station is required in order to support a 1 Mb/s service rate for a single class-s UE. Allocating a 2 Mb/s service rate to a single class-s UE would then require a fraction 0.2 of the total available resources at the serving base station. In the illustrative example, it is assumed that for the class-1 UEs, the capacity requirement coefficient $c_s$ may be presumed to be $c_1=0.1$. Therefore, allocating a 1 Mb/s service rate to a single class-1 UE requires a fraction 0.1 of the total available resources of the base station (where this is derived by 1 Mb/s*0.1=0.1). Also, allocating a 2 Mb/s service rate to a single class-1 UE requires a fraction 0.2 of the total resources (where this is derived by 2 Mb/s*0.1=0.2). Meanwhile, another class of UEs (class-2 UEs 20a) may also be factored into this illustrative example. The class-20 UEs are also located relatively far from the serving base station 30 (FIG. 3), but these UEs are watching high-grade video content (e.g., high-motion video on a larger screen). The class-2 UEs enjoy similar signal strength conditions, as compared to the class-1 UEs, and for this reason the capacity requirement coefficient for class-2 UEs is identical to that for class-1 UEs (i.e., $c_2=0.1$). However, because of the high-grade video content, the possible rate assignments for the class-2 UEs are 2 Mb/s, or 4 Mb/s or zero (0 Mb/s). The correspondingly assigned utility levels are 7 (for 2 Mb/s) and 12 (for 4 Mb/s), respectively, hence the class-2 utility function is given by $U_2(0)=0$, $U_2(2)=7$ and $U_2(4)=12$.

In this illustrative example, a third user class is presumed. Class-3 UEs 10a (FIG. 2) are located relatively close to the serving base station 30, and these UEs request low-grade video content. Since class-3 UEs request similar video content, as compared to class-1 UEs, the possible rate assignments and corresponding utility levels are identical to those for class-1 UEs. Because of the more favorable signal strength conditions, however, the capacity requirement coefficient $c_3$ for class-3 UEs is only $c_3=0.05$, meaning that allocating a 1 Mb/s service rate to a single class-3 UE only requires a fraction 0.05 of the total available resources at the serving base station (rather than 0.1 as for class-1 and class-2 users). Similarly, allocating a 2 Mb/s service rate to a single class-3 UE requires a fraction 0.1 of the total available resources at the serving base station. For purposes of the illustrative example, a fourth user class is presumed, where class-4 UEs 10a are located relatively close to the serving base station, but watch high-grade video content. The capacity requirement coefficient $c_4$ for class-4 UEs is identical to that for class-3 UEs, and the possible rate assignments and corresponding utility levels are the same as for the class-2 UEs.

As shown in step S100 of FIG. 4, a prospective new class-s UE may arrive within the network. In this step, the processor 30e determines which network class (from among S possible classes available) the new UE belongs to, prior to assigning a provisional rate for the new UE.

Figure 2:
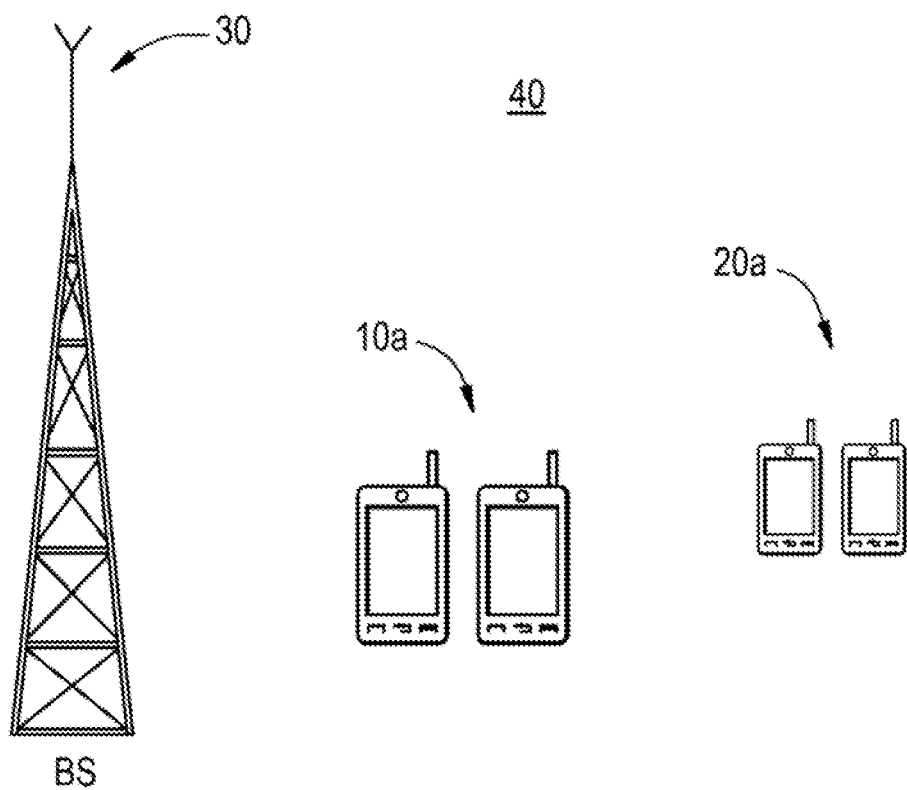
FIG. 2 is a simplified depiction of groups of user equipment (UE) in a wireless network, according to an example embodiment.

In step S102, the processor 30e may assign a provisional rate to a new UE that requests service from the network based on the current value of the control parameter θ, which may be considered as a marginal resource value threshold. It should be appreciated that, as an increasing number of new UEs later arrive or depart the network, and the method of FIG. 2 is repeated, this control parameter θ becomes iteratively refined over a period of time of network use (see the updating of control parameter θ, in steps S110 and S112, below), in which case the most currently available value of control parameter θ may be adopted in this step (that is to say, the initial arbitrary control parameter θ value becomes replaced, as the method of FIG. 4 is repeated and the network becomes optimized over time). Therefore, based on a current value of control parameter θ (the current value either being the initial arbitrary value, or an updated value that is determined over time), the processor 30e may assign the new UE a provisional rate r, as described in the "Rate Assignment Component: ARA-DR (theta)" portion of Subsection A2 of this document (see Section VI). This provisional rate r may be considered a placeholder rate, as the new UE is not actively using the network at this time. In particular, assuming a concave rate utility function, the provisional rate r may be set such that the marginal rate utility for the new UE equals the current value of the control parameter θ, or the provisional rate r is set to the largest amount for which the marginal rate utility for the new UE is no less than the current value of the control parameter θ. Note that this assignment of a provisional rate r does not require actual traffic load information or signal strength statistics for any of the UE classes.

Rate assignments may be explained using the illustrative example, as follows. For the illustrative example, it is assumed that a new UE belongs to class-1, and a current value of the control parameter θ may be presumed to be θ=40. If the processor 30e were to attempt to assign the UE a provisional rate of 1 Mb/s, the marginal pay-off $Q_{11}$ (equation 15h) of adding the new UE may be determined by $(U_1(1)-U_1(0))/(c_1(1-0))=(6-0)/0.1=60$. Because the calculated marginal pay-off $Q_{11}$ is larger than 40, the processor 30e therefore will determine that there is a utility benefit in adding the new UE at a rate of 1 Mb/s. If the new UE were to be assigned a provisional rate of 2 Mb/s, the marginal pay-off $Q_{12}$ would then be $(U_1(2)-U_1(1))/(c_1(2-1))=(8-6)/0.1=20$, which is smaller than 40. Therefore, the processor 30e would determine that there is no utility benefit in adding the new UE at this rate. Thus, the processor 30e would determine that the provisional rate assignment for the new UE shall be 1 Mb/s. However, had the current value of the control parameter θ not been 40, but instead only 10, then the processor 30e would assign a provisional rate of 2 Mb/s.

On the other hand, had the current value of the control parameter not been 40, but instead 70, then even the marginal pay-off for a 1 Mb/s rate assignment (the lowest rate available, according to the illustrative example) would not have been sufficiently large, and therefore in such a scenario the processor 30e would make a 'zero rate' assignment (indicating that the UE will ultimately be blocked from the network, as described further herein). Likewise, had the new UE not belonged to class 1, but instead to class 2, then the marginal pay-off $Q_{\{21\}}$ for a 2 Mb/s rate assignment would be $(U_2(2)-U_2(0))/(c_2(2-0))=(7-0)/(0.1\times 2)=35$, and the rate assignment would have been 0 even for the current value of the control parameter θ=40.

In step S104, the processor 30e then determines the free capacity (m) based on the capacity requirements of all current network UEs, as defined in Equation 29s (shown above), where this determination is derived by simply adding the capacity requirements (at their maximum service rate) for all the current UEs of the network. It is important to note that this free capacity (m) is based on actual, real-time user demand. For example, suppose that the network currently supports 3 class-1 UEs (2 at a rate of 1 Mb/s and 1 at a rate of 2 Mb/s), 0 class-2 UEs, 2 class-3 UEs (at a rate of 2 Mb/s), and 1 class-4 UE (at a rate of 4 Mb/s). Thus $N\_\{11\}=2$, $N\_\{12\}=1$, $N\_\{22\}=0$, $N\_\{24\}=0$, $N\_\{31\}=0$, $N\_\{32\}=2$, $N\_\{42\}=0$ and $N\_\{44\}=1$. The total capacity requirement for all the current UEs is then $0.1 \times 1 \times 2 + 0.1 \times 2 \times 1 + 0.1 \times 2 \times 0 + 0.1 \times 4 \times 0 + 0.05 \times 1 \times 0 + 0.05 \times 2 \times 2 + 0.05 \times 2 \times 0 + 0.05 \times 4 \times 1 = 0.8$, and thus the current free capacity is $m=1-0.8=0.2$. It should be understood that in an actual system implementation, the free capacity (m) may not necessarily be repeatedly calculated, but rather this information may be maintained in a storage array, and only modified when a UE is admitted into the network (i.e., the free capacity would be decreased by the capacity requirement of that particular UE) or a UE leaves the network (i.e., the free capacity would be increased by the capacity requirement of that specific UE), such that that the current free capacity (m) value may simply be accessed, without the need for continually recalculating this value.

In step S104, the processor 30e then compares the current free capacity (m) against a capacity threshold ($m_{min}=\max_{s \in S} c_s r_s^{(M_s)} \leq 1$, as described in the "Adaptive Learning Component: ARA-DA" portion of Subsection A2 of this document, within Section VI). The capacity threshold $m_{min}$ represents the largest amount of capacity required to support any single UE at the UEs maximum allowed rate. If the current free system capacity (m) exceeds the capacity threshold, then the method proceeds to step S106 in order to tag the new UE (and later, in step S118, the new tagged UE is then admitted into the network). The purpose for tagging the new UE is simply to ensure that the UE is included in all future load estimates in an unbiased manner, which does not discriminate based on class identities. It should be understood that the decision on whether or not to tag a UE depends on the system state at the time of the UEs arrival, but not on the class or the provisional rate assignment of the UE.

In step S110, once the new UE has been tagged, the processor 30e may then update control parameter θ (via Equation 30). The determination of the updated control parameter θ first involves calculating the current aggregate load of all tagged UEs (i.e., the total capacity requirement n for all the tagged current UEs). In order to calculate the aggregate load of all tagged UEs fi, for example, suppose that the network supports 3 class-1 UEs (2 at a rate of 1 Mb/s, only one of which is tagged, and 1 also tagged at a rate of 2 Mb/s), 0 class-2 UEs, 2 class-3 UEs (at a rate of 2 Mb/s) one of which is tagged, and 1 tagged class-4 US (at a rate of 4 Mb/s). Thus $\hat{N}\_\{11\}=1$, $\hat{N}\_\{12\}=1$, $\hat{N}\_\{22\}=0$, $\hat{N}\_\{24\}=0$, $\hat{N}\_\{31\}=0$, $\hat{N}\_\{32\}=1$, $\hat{N}\_\{42\}=0$ and $\hat{N}\_\{44\}=1$. Therefore, the total capacity requirement ii for all the tagged current UEs is then $0.1 \times 1 \times 1 + 0.1 \times 2 \times 1 + 0.1 \times 2 \times 0 + 0.1 \times 4 \times 0 + 0.05 \times 1 \times 0 + 0.05 \times 2 \times 1 + 0.05 \times 2 \times 0 + 0.05 \times 4 \times 1 = 0.6$. It should be understood that in an actual system implementation, the aggregate load for the tagged UEs n̂ would not be repeatedly calculated but maintained in a storage array, and only modified when a tagged UE is admitted into the network (decreased by the capacity requirement of that particular user), or when a tagged UE leaves the network (increased by the capacity requirement of that specific UE), such that the current value can simply be accessed, without the need for continuously recalculating this value.

Suppose that the current value of the control parameter is θ=40, and that the step size is ϵ=0.08. It should be understood that step size E relates to a magnitude of change that may be implemented in determining the value of control parameter θ, where step size E may be appropriately chosen by a network operator (where it is noted that a smaller value of step size E may provide higher accuracy in determining control parameter θ, with the trade-off that a smaller step size ϵ will cause the method of FIG. 4 to converge on the optimized control parameter θ value more slowly and be less responsive in tracking changes in system statistics, such as gradual variations in the offered load or spatial distribution of UEs over the course of a day). Based on the assumed control parameter θ=40 and step size ϵ=0.08, the updated value of the control parameter θ is obtained (via equation 30, above), by adding $0.08 \times (0.6-1) = -0.032$, yielding θ=39.968, where the value 0.6 refers to the aggregate load n̂ for all the tagged UEs, and the value of 1 represents the indicator variable value $\hat{T}$ (which may be a value of 0 or 1, where 1 indicates the UE is tagged and 0 indicates the UE is not tagged). The purpose of this update is to continue to adaptively refine the control parameter θ over time (and use the refined control parameter θ value in step S102, the next time a new UE attempts to enter the network).

After the new UE is tagged (step S106), and the control parameter θ has been updated (step S110), in step S114 the processor 30e may update the total load ii for all tagged UEs (as defined in via Equation 29u) by adding the capacity requirement for the newly tagged UE to the load for all other tagged UEs.

In step S117, the processor 30e determines whether the new UE has been given a zero rate assignment (as described in step S102, above). In the event that the new UE has been assigned a zero rate, then the new UE is blocked from the network (at step S130). In the event that the new UE has not been assigned a zero rate, then the newly tagged UE is admitted into the network (in step S118), where the new UE is allocated the provisional rate (as determined in step S102).

As shown in FIG. 2, if in step S104 the processor 30e determines that the current free system capacity (m) does not exceed the capacity threshold $m_{min}$, then the processor 30e determines that the new UE shall not be tagged, as indicated in step S108. In this event, in step S112, the processor 30e updates the control parameter θ, in a similar fashion as step S110 (although this time, the update of the control parameter θ accounts for the fact that the new UE is not tagged, and therefore the processor 30e incrementally increases the control parameter θ, rather than decreasing this value). For example, supposing again that the current value of the control parameter is θ=40, and the step size is ϵ=0.08. Then, the updated value of the control parameter may be obtained by adding $0.08 \times 0.6 = 0.048$, where the value 0.6 refers once again to the aggregate load for all the tagged UEs and the value of the 0-1 indicator variable $\hat{T}$ is now 0, because the new UE is not tagged. Just like in step S110, the purpose of this updated control parameter θ value is to continue to adaptively refine the value over time (and use the refined control parameter θ value in step S102, the next time a new UE attempts to enter the network).

Following step S112, the processor 30e then determines, in step S115, whether the new UE has been given a zero rate assignment (as described in step S102, above). In the event that the new UE has been assigned a zero rate, then the new UE is blocked from the network (at step S130). In the event that the new UE has not been assigned a zero rate, then the method proceeds to step S116.

In step S116, the processor 30e compares the current free capacity (m) against the provisional capacity requirement assigned to the new UE. The provisional capacity requirement of the new UE is calculated as the product of the provisional rate assignment of the new UE (as determined in S102) and the capacity requirement coefficient $c_s$. If the current free capacity (m) exceeds the provisional capacity requirement assigned to the new UE, the processor 30e determines to admit the new UE (as shown in step S118), and the UE is allocated the provisional rate (as determined in step S102). Otherwise, the new UE is blocked, and not admitted to the network, as shown in step S130.

In the event that the new UE is admitted (step S118), then in step S120 the processor 30e re-calculates the free capacity (m) (as defined in Equation 29s). This determination of the free capacity (m) now accounts for the newly admitted UE, using the provisional rate for the new UE (as calculated in step S102). This re-calculation of the free capacity (m) may be accomplished by decreasing the previous value of the free capacity (m) by the capacity requirement of the new UE.

At the termination of this method associated with the arrival of a new UE (either following step S120, following the re-calculation of the free capacity, or following step S130 when the user is blocked), the method may then be re-started with the arrival of another new UE (the method will restart), or with the departure of a UE (in step S122, described below).

When a UE of the network departs, the processor 30e may determine which network class (from among S possible classes) the departing UE belongs to, prior to updating or recalculating the free capacity (as defined in Equation 29s). This determination of the free capacity (m) now accounts for the vacancy of the departing UE, using the capacity requirement for that UE as determined by the provisional rate that was allocated to the UE upon arrival (as previously calculated in step S102) for the duration of time that the network serviced the UE along with the capacity requirement coefficient for the class of the UE. Specifically, the calculation of the free capacity (m) may be accomplished by increasing the previous value of the free capacity (m) by this capacity requirement of the departing UE.

In step S126, the processor 30e determines whether the departing UE is a tagged user. In the event that the UE is not tagged, this example method ends. However, in the event that the departing UE is a tagged UE, the processor 30e then updates the total load ñ for all tagged UEs (as defined in via Equation 29u) by decreasing the previous value of the aggregate load for all tagged UEs by the capacity requirement for the departing UE as determined by the provisional rate that was allocated to that UE upon arrival for the duration of time that the network service the UE along with the capacity requirement for the class of the UE, in step S128.

Following the termination of this method for the departing UE, either after the processor 30e determines that the UE is not a tagged UE (step S126), or following the updating of the total load ñ for all tagged UEs (step S128), the method of FIG. 2 may be reinitiated when a new UE arrives in the network (step S100), or when another UE departs from the network (step S122).

Continuous Rates ("Scenario C")

Having described the method of FIG. 2 using a discrete set of possible target rates for users (as described above), it should be understood that this same method may also be implemented using a continuous range of potential rates for UEs. Such a method would be identical to the description of FIG. 2 (above), with only some modifications to step S102. Specifically, in step S102, rather than having the processor 30e determine the marginal pay-off $Q_{sm}$ (equation 15h) for adding a UE, by trying each discrete rate in order to find provisional rates with marginal pay-offs $Q_{sm}$ that are larger than control parameter θ, the processor 30e may merely calculate the provisional rate based on equation (34h) to be the largest rate for which the marginal pay-off is larger than the control parameter θ. In the continuous rate scenario, the marginal pay-off is defined as the left-derivative of the utility function $U_s$ for the class of the new UE, divided by the capacity requirement coefficient $c_s$ for the class s of the new UE. After the processor 30e makes this determination of the provisional rate, and assigns this provisional rate to the user in step S102, use of this provisional rate in the remaining steps of FIG. 2 is identical to the steps describe above with regard to the discrete rate scenario.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A rate allocation method, comprising:
adapting, by a processor, a control parameter value as user equipment (UE) enter a network sector based on a total load for tagged UE of the network sector and a determination to tag a prospective new UE, wherein the tagged UEs of the network sector correspond with all current and prospective network sector UEs that entered the network sector at an instance when the processor determined that the free capacity of the network sector is larger than or equal to a capacity threshold;
assigning, by the processor, a provisional rate for the prospective new UE of the network sector based on the control parameter value and a determined marginal pay-off for admitting the prospective new UE;
determining, by the processor, free capacity of the network sector;
admitting, by the processor, the prospective new UE if enough free capacity exists in order for the network sector to service the prospective new UE at the provisional rate,
wherein this method is accomplished without the knowledge of channel and traffic statistics of the network sector.

2. The method of claim 1, wherein the adapting comprises:
assigning an initial arbitrary value to be the control parameter value,
iteratively adjusting the initial arbitrary value each time a UE enters the network sector by,
determining a load demand for all tagged UEs of the network sector, wherein the load demand is based on a load of all tagged UEs at their respective service rates,
selecting a step size value for the control parameter,
determining an increment value based on the determined load and the step size,
adding the increment value to one of the initial arbitrary value and the current control parameter value to arrive at a current control parameter value.

3. The method of claim 2, wherein the assigning of the provisional rate for the prospective new UE includes,
determining the marginal pay-off for admitting the prospective new UE for each of a plurality of available provisional rates for the prospective new UE,
selecting the largest of the available provisional rates that has a marginal pay-off that exceeds the control parameter to be the provisional rate for the prospective new UE.

4. The method of claim 2, wherein,
the assigning the provisional rate for the prospective new UE includes,
determining the largest rate for which the marginal pay-off for admitting the prospective new UE exceeds the control parameter, wherein this determined largest rate is the provisional rate for the prospective new UE
the determining of the free capacity of the network sector includes,
summing a real-time load demand of all current UEs at the current UE's service rate.

5. The method of claim 4, wherein the admitting of the prospective new UE includes,
comparing the determined free capacity of the network sector to the capacity threshold, wherein the capacity threshold is the largest amount of capacity that is required to support any particular network sector UE at a maximum allowed rate for the particular network sector UE,
tagging the prospective new UE if the determined free capacity is equal to or greater than the capacity threshold.

6. The method of claim 5, further comprising:
incrementally increasing the current control parameter value by a positive increment value based on the step size and the total load of the tagged UEs, if the prospective new UE is not tagged; and
incrementally decreasing the current control parameter value by a negative increment value based on the step size and the total load of the tagged UEs, if the prospective new UE is tagged.

7. The method of claim 6, wherein the admitting of the prospective new UE includes,
performing the following steps if the prospective new UE is tagged,
incrementally increasing the total load for tagged UEs by a provisional capacity requirement for the prospective new UE, the provisional capacity requirement being equal to the provisional rate of the prospective new UE multiplied by a capacity requirement coefficient, wherein the capacity requirement coefficient is a function of a signal strength experienced by the prospective new UE,
admitting the prospective new UE as a newly tagged-and-admitted UE,
incrementally decreasing the free capacity of the network sector by the provisional capacity requirement for the prospective new UE.

8. The method of claim 6, wherein the admitting of the prospective new UE includes,
performing the following steps if the prospective new UE is not tagged,
comparing the free capacity of the network sector against the provisional capacity requirement for the prospective new UE,
if the free capacity of the network sector equal or exceeds the provisional capacity requirement for the prospective new UE,
admitting the prospective new UE to the network sector, and
incrementally decreasing the free capacity of the network sector by the provisional capacity requirement for the prospective new UE,
blocking the prospective new UE from the network sector, if the free capacity of the network sector is less than the provisional capacity requirement for the prospective new UE.

9. The method of claim 6, wherein the assigning of the provisional rate for the prospective new UE includes,
assigning the prospective new UE a zero-rate, if the marginal pay-off for admitting the prospective new UE does not exceed the control parameter value for a lowest rate that is available for the prospective new UE,
blocking the prospective new UE from the network sector, if the prospective new UE is assigned a zero-rate.

10. The method of claim 2, further comprising:
if a UE departs the network sector, performing the steps of,
incrementally increasing the free capacity of the network sector by a provisional capacity requirement for the departing UE, the provisional capacity requirement being equal to the provisional rate of the departing UE multiplied by a capacity requirement coefficient, wherein the capacity requirement coefficient is a function of a signal strength experienced by the departing UE,
if the departing UE is a tagged UE, incrementally decreasing the total load for tagged UEs by the provisional capacity requirement for the departing UE.

11. A device, comprising:
a processor, configured to,
adapt a control parameter value as user equipment (UE) enter a network sector based on a total load for tagged UE of the network sector and a determination to tag a prospective new UE, wherein the tagged UEs of the network sector correspond with all current and prospective network sector UEs that entered the network sector at an instance when the processor determined that the free capacity of the network sector is larger than or equal to a capacity threshold;
assign a provisional rate for the prospective new UE of the network sector based on the control parameter value and a determined marginal pay-off for admitting the prospective new UE;
determine free capacity of the network sector;
admit the prospective new UE if enough free capacity exists in order for the network sector to service the prospective new UE at the provisional rate,
wherein the processor does not require knowledge of channel and traffic statistics of the network sector.

12. The device of claim 11, wherein the processor adapts the control parameter value by being further configured to,
assign an initial arbitrary value to be the control parameter value,
iteratively adjust the initial arbitrary value each time a UE enters the network sector by,
determine a load demand for all tagged UEs of the network sector, wherein the load demand is based on a load of all tagged UEs at their respective service rates,
select a step size value for the control parameter,
determine an increment value based on the determined load and the step size,
add the increment value to one of the initial arbitrary value and the current control parameter value to arrive at a current control parameter value.

13. The device of claim 12, wherein the processor assigns the provisional rate for the prospective new UE by being further configured to,
determine the marginal pay-off for admitting the prospective new UE for each of a plurality of available provisional rates for the prospective new UE,
select the largest of the available provisional rates that has a marginal pay-off that exceeds the control parameter to be the provisional rate for the prospective new UE.

14. The device of claim 12, wherein,
the processor assigns the provisional rate for the prospective new UE by being further configured to,
determine the largest rate for which the marginal pay-off for admitting the prospective new UE exceeds the control parameter, wherein this determined largest rate is the provisional rate for the prospective new UE
the processor determines the free capacity of the network sector by being further configured to,
sum a real-time load demand of all current UEs at the current UE's service rate.

15. The device of claim 14, wherein the processor admits the prospective new UE by being further configured to,
compare the determined free capacity of the network sector to the capacity threshold, wherein the capacity threshold is the largest amount of capacity that is required to support any particular network sector UE at a maximum allowed rate for the particular network sector UE,
tag the prospective new UE if the determined free capacity is equal to or greater than the capacity threshold.

16. The device of claim 15, wherein the processor is further configured to,
incrementally increase the current control parameter value by a positive increment value based on the step size and the total load of the tagged UEs, if the prospective new UE is not tagged; and
incrementally decrease the current control parameter value by a negative increment value based on the step size and the total load of the tagged UEs, if the prospective new UE is tagged.

17. The device of claim 16, wherein the processor admits of the prospective new UE by being further configured to,
perform the following steps if the prospective new UE is tagged,
incrementally increase the total load for tagged UEs by a provisional capacity requirement for the prospective new UE, the provisional capacity requirement being equal to the provisional rate of the prospective new UE multiplied by a capacity requirement coefficient, wherein the capacity requirement coefficient is a function of a signal strength experienced by the prospective new UE,
admit the prospective new UE as a newly tagged-and-admitted UE,
incrementally decrease the free capacity of the network sector by the provisional capacity requirement for the prospective new UE.

18. The device of claim 16, wherein the processor admits the prospective new UE by being further configured to,
perform the following steps if the prospective new UE is not tagged,
compare the free capacity of the network sector against the provisional capacity requirement for the prospective new UE,
if the free capacity of the network sector equal or exceeds the provisional capacity requirement for the prospective new UE,
admit the prospective new UE to the network sector, and
incrementally decrease the free capacity of the network sector by the provisional capacity requirement for the prospective new UE,
block the prospective new UE from the network sector, if the free capacity of the network sector is less than the provisional capacity requirement for the prospective new UE.

19. The device of claim 16, wherein the processor assigns the provisional rate for the prospective new UE by being further configured to,
assign the prospective new UE a zero-rate, if the marginal pay-off for admitting the prospective new UE does not exceed the control parameter value for a lowest rate that is available for the prospective new UE,
block the prospective new UE from the network sector, if the prospective new UE is assigned a zero-rate.

20. The device of claim 12, wherein the processor is further configured to,
if a UE departs the network sector, perform the steps of,
incrementally increase the free capacity of the network sector by a provisional capacity requirement for the departing UE, the provisional capacity requirement being equal to the provisional rate of the departing UE multiplied by a capacity requirement coefficient, wherein the capacity requirement coefficient is a function of a signal strength experienced by the departing,
if the departing UE is a tagged UE, incrementally decrease the total load for tagged UEs by the provisional capacity requirement for the departing UE.

* * * * *